(12) United States Patent
Chatwin et al.

(10) Patent No.: US 10,402,166 B2
(45) Date of Patent: Sep. 3, 2019

(54) SYSTEM AND METHOD FOR PROCESSING DATA IN AN ADDER BASED CIRCUIT

(71) Applicant: SONY CORPORATION, Tokyo (JP)

(72) Inventors: Jeremy Chatwin, Santa Cruz, CA (US); Jacob Adams Wysocki, Santa Cruz, CA (US)

(73) Assignee: SONY CORPORATION, Tokyo (JP)

( * ) Notice: Subject to any disclaimer, the term of this patent is extended or adjusted under 35 U.S.C. 154(b) by 100 days.

(21) Appl. No.: 15/017,330

(22) Filed: Feb. 5, 2016

(65) Prior Publication Data

US 2017/0228215 A1    Aug. 10, 2017

(51) Int. Cl.
  *G06F 7/504* (2006.01)
  *G06F 7/509* (2006.01)
  *G06F 7/523* (2006.01)

(52) U.S. Cl.
  CPC .............. *G06F 7/523* (2013.01); *G06F 7/509* (2013.01); *G06F 7/5045* (2013.01)

(58) Field of Classification Search
  CPC .......................... G06F 17/30486; G06F 1/0328
  USPC ................................................. 708/523, 670
  See application file for complete search history.

(56) References Cited

U.S. PATENT DOCUMENTS

| | | | | |
|---|---|---|---|---|
| 7,675,440 B1 * | 3/2010 | Xiao | ................... | H03M 1/0809 341/118 |
| 9,356,614 B1 * | 5/2016 | Amelifard | ........... | H03M 7/6047 |
| 2003/0001639 A1 * | 1/2003 | Kim | ........................ | H03L 7/089 327/160 |
| 2007/0195917 A1 * | 8/2007 | Landmark | ............... | H03L 7/093 375/376 |
| 2009/0141845 A1 * | 6/2009 | Ballantyne | .............. | H03L 7/085 375/376 |
| 2010/0073054 A1 * | 3/2010 | Bereza | .................... | H03L 7/093 327/159 |
| 2011/0064176 A1 * | 3/2011 | Takada | ...................... | H03L 7/07 375/355 |
| 2012/0049914 A1 * | 3/2012 | Pellerano | .............. | H03L 7/1974 327/158 |

OTHER PUBLICATIONS

Vergos et al "On path delay fault testing of multiplexer-based shifters" published in VLSI, 1999. Proceedings. Ninth Great Lakes Symposium, on Aug. 6, 2002, Print ISBN: 0-7695-0104-4.*

(Continued)

*Primary Examiner* — Yuqing Xiao
*Assistant Examiner* — Emily E Larocque
(74) *Attorney, Agent, or Firm* — Chip Law Group

(57) ABSTRACT

Various aspects of a system and method to process data in an adder based circuit, such as an integrated circuit, are disclosed herein. In accordance with an embodiment, a first addend is encoded as a first unary number. The first unary number comprises a token bit. A second addend is encoded as a second unary number. A first shift operation is performed on the token bit in the first unary number based on the second unary number. The first shift operation is performed to generate an output unary number. The generated output unary number is decoded to a number representation that corresponds to the number representation of the first addend and/or the second addend. The decoded number representation indicates a summation of the first addend and the second addend.

15 Claims, 21 Drawing Sheets

(56) References Cited

OTHER PUBLICATIONS

Vun, C. H. et al. "Sum of products: Computation using modular thermometer codes" published in Intelligent Signal Processing and Communication Systems (ISPACS), 2014 International Symposium, on Jan. 29, 2015.*
Vun, C. H. et al. "Thermometer Code Based Modular Arithmetic" Published in: Engineering and Technology (S-CET), 2012 Spring Congress, on Nov. 12, 2012.*
Alexander, J.D.H. "Clock recovery from random binary signals" published in Electronics Letters ( vol. 11, Issue: 22, Oct. 30, 1975 ), on Oct. 30, 1975.*
Peter Wilson, Design Recipes for FPGAs, Newnes, Oct. 1, 2015, section 24.5.*
Geoff Lewis, Communications Technology Handbook, Newnes, 1994, section 1.7.*
W. Alan Davis, Radio Frequency Circuit Design, Second Edition, Wiley Series in Microwave and Optical Engineering, 2011 Section 12.11 (Year: 2011).*
Office Action for JP Patent Application No. 2017-018101, dated Dec. 25, 2017 03 pages of Office Action and 03 pages of English Translation.

\* cited by examiner

| Decimal Number representation | First Addend 210a Input | | | Token encoder 202 Output | | | | | | | |
|---|---|---|---|---|---|---|---|---|---|---|---|
| | $x0_2$ | $x0_1$ | $x0_0$ | $a_{-4}$ | $a_{-3}$ | $a_{-2}$ | $a_{-1}$ | $a_0$ | $a_1$ | $a_2$ | $a_3$ |
| -4 | 1 | 0 | 0 | 1 | 0 | 0 | 0 | 0 | 0 | 0 | 0 |
| -3 | 1 | 0 | 1 | 0 | 1 | 0 | 0 | 0 | 0 | 0 | 0 |
| -2 | 1 | 1 | 0 | 0 | 0 | 1 | 0 | 0 | 0 | 0 | 0 |
| -1 | 1 | 1 | 1 | 0 | 0 | 0 | 1 | 0 | 0 | 0 | 0 |
| 0 | 0 | 0 | 0 | 0 | 0 | 0 | 0 | 1 | 0 | 0 | 0 |
| +1 | 0 | 0 | 1 | 0 | 0 | 0 | 0 | 0 | 1 | 0 | 0 |
| +2 | 0 | 1 | 0 | 0 | 0 | 0 | 0 | 0 | 0 | 1 | 0 |
| +3 | 0 | 1 | 1 | 0 | 0 | 0 | 0 | 0 | 0 | 0 | 1 |

FIG. 3A

| Decimal Number representation | First Addend 210a Input | | | Token Encoder 202 Output | | | | | | | |
|---|---|---|---|---|---|---|---|---|---|---|---|
| | $x0_2$ | $x0_1$ | $x0_0$ | $a_{-4}$ | $a_{-3}$ | $a_{-2}$ | $a_{-1}$ | $a_0$ | $a_1$ | $a_2$ | $a_3$ |
| -4 | 1 | 0 | 0 | | 1 | 1 | 1 | 1 | 1 | 1 | 1 |
| -3 | 1 | 0 | 1 | 0 | 1 | 1 | 1 | 1 | 1 | 1 | 1 |
| -2 | 1 | 1 | 0 | 0 | 0 | 1 | 1 | 1 | 1 | 1 | 1 |
| -1 | 1 | 1 | 1 | 0 | 0 | 0 | 1 | 1 | 1 | 1 | 1 |
| 0 | 0 | 0 | 0 | 0 | 0 | 0 | 0 | 1 | 1 | 1 | 1 |
| +1 | 0 | 0 | 1 | 0 | 0 | 0 | 0 | 0 | 1 | 1 | 1 |
| +2 | 0 | 1 | 0 | 0 | 0 | 0 | 0 | 0 | 0 | 1 | 1 |
| +3 | 0 | 1 | 1 | 0 | 0 | 0 | 0 | 0 | 0 | 0 | 1 |

FIG. 3B

| Decimal Number representation | Second Addend 210b Input | | Shift Encoder 204a Output | | |
|---|---|---|---|---|---|
| | $x1_1$ | $x1_0$ | $s_{-1}$ | $s_0$ | $s_1$ |
| -1 | 1 | 1 | 1 | 0 | 0 |
| 0 | 0 | 0 | 0 | 1 | 0 |
| +1 | 0 | 1 | 0 | 0 | 1 |

FIG. 3C

| Second Unary Number 214a | | | Shifted Output Token 216a | | | | | | | | | |
|---|---|---|---|---|---|---|---|---|---|---|---|---|
| $s_{-1}$ 411 | $s_0$ 412 | $s_1$ 413 | $b_{-5}$ | $b_{-4}$ | $b_{-3}$ | $b_{-2}$ | $b_{-1}$ | $b_0$ | $b_1$ | $b_2$ | $b_3$ | $b_4$ |
| 1 | 0 | 0 | $a_{-4}$ | $a_{-3}$ | $a_{-2}$ | $a_{-1}$ | $a_0$ | $a_1$ | $a_2$ | $a_3$ | 0 | 0 |
| 0 | 1 | 0 | 0 | $a_{-4}$ | $a_{-3}$ | $a_{-2}$ | $a_{-1}$ | $a_0$ | $a_1$ | $a_2$ | $a_3$ | 0 |
| 0 | 0 | 1 | 0 | 0 | $a_{-4}$ | $a_{-3}$ | $a_{-2}$ | $a_{-1}$ | $a_0$ | $a_1$ | $a_2$ | $a_3$ |

FIG. 4E

SYSTEM AND METHOD FOR PROCESSING DATA IN AN ADDER BASED CIRCUIT

CROSS-REFERENCE TO RELATED APPLICATIONS/INCORPORATION BY REFERENCE

None.

FIELD

Various embodiments of the disclosure relate to processing of data in an adder based circuit. More specifically, various embodiments of the disclosure relate to processing of data in an adder based circuit for summation of multiple addends.

BACKGROUND

With recent advancements in integrated circuit (IC) processing and/or designing techniques, the role of adders to complement the continuously advancing data processing technology have also increased. Adders are considered pivotal for the operations of computers, processors, and/or other digital integrated circuits, such as Digital Phase Locked Loops (DPLL) circuits, Multiply-Accumulate (MAC) circuits for Digital Signal Processors (DSP) and/or circuits that require transmission of high speed data for the generation of high frequency clock sources.

Currently, most of the digital ICs perform data processing operations on a single pair of numbers at a time. The data processing operations are usually tailored to handle large numbers that require numerous bits for representation. In certain scenarios, when the data processing operations are required to handle large quantity of small numbers, the conventional data processing techniques by use of conventional adders incur penalties to processing performance related to latency, power, and/or area. Hence, an efficient technique or mechanism may be required to process data in an advanced adder based circuit, where multiple addends may be added and/or subtracted in an optimized manner.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and a method to process data in an adder based circuit substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIGS. 3A, 3B, and 3C illustrate data processing operations related to encoding of addends in an adder, in accordance with an embodiment of the disclosure.

FIGS. 4A to 4G illustrate data processing operations related to a token shift mechanism in an adder, in accordance with an embodiment of the disclosure.

DETAILED DESCRIPTION

Figure 1A:
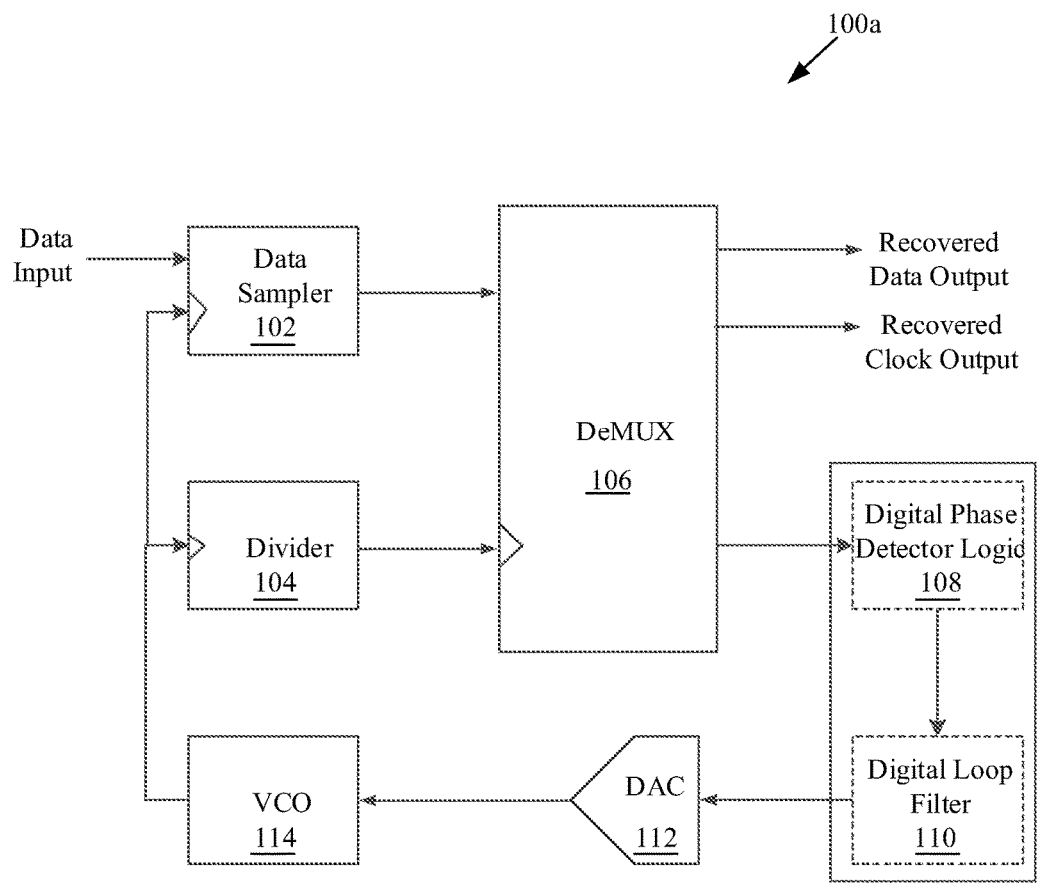
FIG. 1A is a block diagram that illustrates an exemplary top level diagram of an integrated circuit for implementation of the disclosed system and method, in accordance with an embodiment of the disclosure.

The following described implementations may be found in disclosed system and a method that processes data in an adder based circuit. Exemplary aspects of the disclosure may comprise a system that may be configured to encode a first addend as a first unary number. The first unary number may comprise a token bit. A second addend may be encoded as a second unary number. A first shift operation may be performed on the token bit in the first unary number based on the second unary number. The first shift operation may be performed to generate an output unary number. The generated output unary number may be decoded to a number representation that may correspond to the number representation of the first addend and/or the second addend. In accordance with an embodiment, the decoded number representation may indicate a summation of the first addend and the second addend.

In accordance with an embodiment, the first addend may be encoded by a token encoder. The second addend may be encoded by a shift encoder. The shift operation on the token bit may be performed by a token shifter. The generated output unary number may be decoded by a token decoder.

In accordance with an embodiment, the shift operation may correspond to a shift in a position of the token bit in the first unary number based on the second unary number. The shift operation to shift the position of the token bit in the first unary number may be performed to generate the output unary number. In accordance with an embodiment, a multi-state signal, such as a three-state signal, may be generated based on a comparison of a signal edge of an input signal with another signal edge of a reference signal at a time instant. The generated multi-state signal may represent phase error information.

In accordance with an embodiment, whether the phase error information is less than or equal to a predetermined threshold, such as zero, may be detected. The first shift operation may be performed when the phase error information is greater than the predetermined threshold.

In accordance with an embodiment, the phase error information may be coded to a binary coded number. The coded phase error information may be stored in a memory element as one or more bits. The one or more bits may represent the binary coded number. A shift in position of the token bit in the generated output unary number may indicate an increment or a decrement in a numeric value of the binary coded number. In accordance with an embodiment, the binary coded number may correspond to the stored and coded phase error information.

In accordance with an embodiment, a second shift operation may be performed on a position of the token bit in the generated output unary number. The second shift operation may be based on a third unary number. In accordance with an embodiment, the third unary number may be an encoded third addend. The encoded third addend may correspond to an incoming phase error information.

In accordance with an embodiment, the second shift operation may be performed when the incoming phase error information is not equal to zero or is greater than the predetermined threshold. The first addend may correspond to the stored binary coded number. The second addend may correspond to an incoming phase error information.

In accordance with an embodiment, an update information to generate a control signal for a voltage controlled oscillator (VCO) may be determined. The update information may be determined based on the position of the token bit in the generated output unary number. The control signal may be used to adjust a frequency of the VCO. The adjusted frequency may correspond to the reference signal.

In accordance with an embodiment, the update information to generate the control signal for the VCO may be determined based on the decoded number representation that indicates the summation of the first addend and the second addend. In accordance with an embodiment, a bit value of the token bit of the first unary number may be different from bit values of other bits that correspond to the first unary number. In accordance with an embodiment, the first unary number may comprise a n-bit wide token. The n-bit wide token may be represented by a set of n-number of wires. A position of the token bit in the n-bit wide token may indicate a value of the first addend.

FIG. 1A is a block diagram that illustrates an exemplary top level diagram of an integrated circuit for implementation of the disclosed system and method to process data, in accordance with an embodiment of the disclosure. With reference to FIG. 1A, there is shown a top level diagram of an integrated circuit for a digital phase locked loop (DPLL) 100a. The DPLL 100 may include one or more circuits, such as a data sampler 102, a divider 104, a demultiplexer (DeMUX) 106, a digital phase detector logic 108, a digital loop filter 110, a digital-to-analog converter (DAC) 112, and a voltage controlled oscillator (VCO) 114. The digital loop filter 110 may be communicatively coupled to the digital phase detector logic 108 and the DAC 112.

The data sampler 102 may comprise suitable logic, circuitry, code and/or interface that may be configured to sample input data by use of a clock signal (a reference input) from the VCO 114. Examples of the data sampler 102 may include, but are not limited to, a Nyquist data sampling based sampler, and/or a zero crossing sampler, and/or other data samplers known in the art.

The divider 104 may comprise suitable logic, circuitry, interface, and/or code that may be configured to divide frequency of an incoming signal. The output of divider 104 may act as a clock to the DeMUX 106. A portion of output of divider 104 may be fed back to the digital phase detector logic 108 from the DeMUX 106.

The DeMUX 106 may comprise suitable logic, circuitry, interface, and/or code that may be configured to distribute data signals to several output lines, as shown. The DeMUX 106 may be configured to receive a clock signal from the divider 104 and a digital data output signal from the data sampler 102. The DeMUX 106 may output recovered data and recovered clock.

The digital phase detector logic 108 may refer to a suitable logic, circuitry, interface, and/or code that may detect a phase error signal by comparing the relative timing of the edges of the input signals associated with the data sampler 102. In an implementation, the data sampler 102, the DeMUX 106, and the digital phase detector logic 108 may be implemented in a single unit, such as by use of a bang-bang phase detector. Notwithstanding, other types of phase detectors may be employed to perform the functionalities of the digital phase detector logic 108, and/or one or more other units as described in FIG. 1A, without limiting the scope of the disclosure. Accordingly, one or more other units as described in FIG. 1A, may be implemented in combination or as a separate entity, without limiting the scope of the disclosure. Examples of the other types of phase detectors may refer to a XOR phase detector, an edge-triggered JK flip-flop phase-frequency detector, a dual D-type phase comparator, and/or other type I phase detector or type II phase detector, or the like. Alternatively, in accordance with an embodiment, the digital phase detector logic 108 may detect a phase error signal by comparing the relative timing of the edges of the applied input signals, when the incoming signals are at same frequency. A digital data input signal from a reference source may be fed as one input signal and a reference signal from the output of the VCO 114 may be fed as another input signal to the digital phase detector logic 108. The digital phase detector logic 108 may detect whether the phase of the input signal lags the phase of the reference signal to generate phase error information.

Figure 1B:
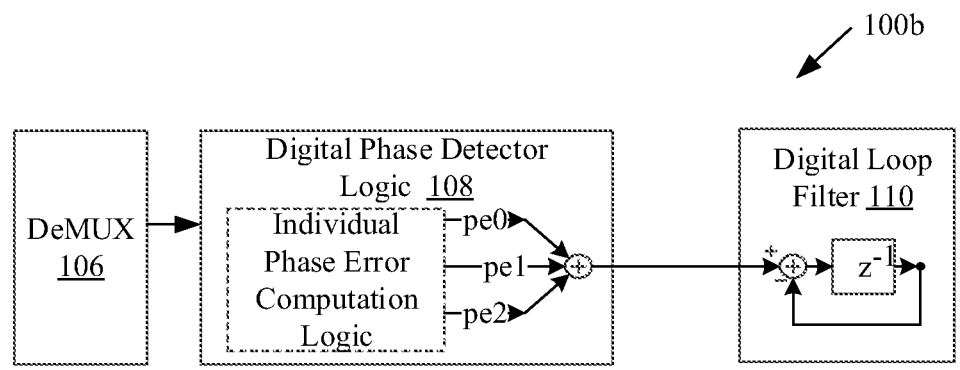
FIGS. 1B and 1C are block diagrams that illustrate signal flow with regards to DeMUX, phase detector logic, and digital loop filter in an integrated circuit for implementation of the disclosed system and method, in accordance with an embodiment of the disclosure.
Figure 1C:
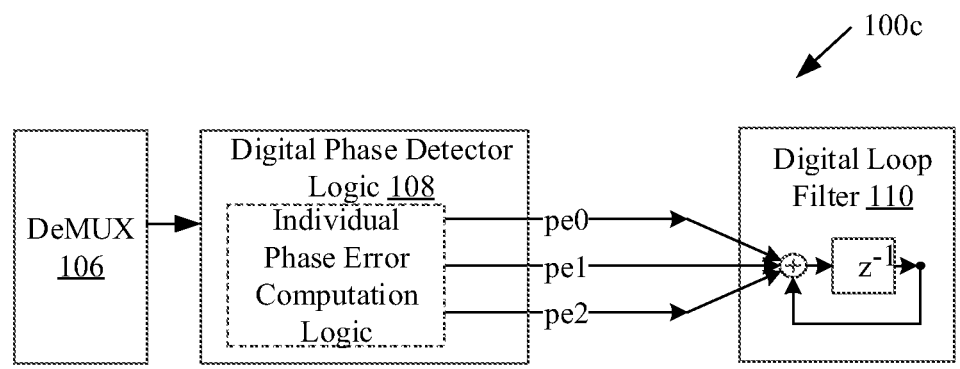

The digital loop filter 110 may comprise suitable logic, circuitry, interface, and/or code that may be configured to control the dynamic behavior and stability of the DPLL 100. The digital loop filter 110 may be used to remove unwanted spurious signals that may disturb the desired operation of VCO 114. One or more parts of the digital loop filter 110 may be configured to utilize a transfer function of the digital loop filter 110, such that the digital loop filter 110 may output a control signal by integrating the received input phase error signal over time. In accordance with an embodiment, the connection between the digital loop filter 110 and the digital phase detector logic 108 (or the bang-bang phase detector when present) is shown and explained as shown in FIGS. 1B and 1C. In accordance with an embodiment, a plurality of addends may be utilized to minimize the phase error information. In accordance with an embodiment, the digital loop filter 110 may be implemented based on, but not limited to, a finite impulse response (FIR) filter or an infinite impulse response (IIR) filter. In accordance with an embodiment, the digital phase detector logic 108 and the digital loop filter 110 may be implemented as a single entity (as shown in FIG. 1A).

The DAC 112 may comprise suitable logic, circuitry, and/or interfaces that may be configured to convert digital data signal received from the digital loop filter 110 into an analog data signal. The analog data signal may be further transmitted to the VCO 114. Examples of the DAC 112 may include, but are not limited to, a successive-approximation DAC, an R-2R ladder DAC, a binary-weighted DAC, a unary-weighted DAC, a segmented DAC, a thermometer-coded DAC, and/or a hybrid DAC.

The VCO 114 may comprise suitable logic, circuitry, code and/or interfaces that may be configured to receive the control signal (such as a voltage control signal) from the digital loop filter 110, via the DAC 112. Based on the received control signal, the VCO 114 may adjust the frequency of an oscillator (in the VCO 114) to generate a clock signal that may minimize the phase error information over a plurality of VCO cycles. The generated clock signal may be the reference signal at the input of the digital phase detector logic 108. Examples of implementation of the VCO 114 may include, but are not limited to, an analog voltage controlled oscillator, a digitally controlled oscillator (DCO), and/or a numerically controlled oscillator (NCO). In an implementation, the VCO 114 may be an analog voltage controlled oscillator. In order to supply an analog voltage control signal, the DAC 112 may be employed to convert the control signal from the digital loop filter 110 that may be a digital control signal into an analog control signal. In accordance with an embodiment, the VCO 114 may be a digital voltage controlled oscillator. In such cases, the DPLL 100 may not require the DAC 112.

In operation, the data sampler 102 may be configured to receive a data input signal. The data input signal may be received from a reference source (not shown in FIG. 1A). In accordance with an embodiment, the received data input signal may be sampled by use of a clock signal received from the VCO 114. The sampled data input signal may be communicated to the DeMUX 106. The divider 104 may be configured to divide frequency of the clock signal by a predetermined factor. The clock signal from the divider 104 may be used as another input of the DeMUX 106.

In accordance with an embodiment, the DeMUX 106 may be configured to supply the data input signal and the clock signal to the digital phase detector logic 108. The digital phase detector logic 108 may be configured to compare a relative time corresponding to a rising edge of the clock signal from the VCO 114 and an edge of the data input signal from the reference source. In accordance with an embodiment, the digital phase detector logic 108 may be configured to generate a multi-state signal based on a comparison of a signal edge of an input signal, such as the data input signal, with another signal edge of a reference signal, such as the clock signal, at a certain time instance. In accordance with an embodiment, the generated multi-state signal may correspond to the phase error information.

In accordance with an embodiment, the phase error information may represent whether the rising edge of the clock signal has arrived earlier or later with respect to the edge of the data input signal. In accordance with an embodiment, the phase error information may further represent whether the falling edge of the clock signal has arrived earlier or later with respect to the edge of the data input signal. A person having ordinary skill in the art will understand that the scope of the disclosure should not be limited to the comparison of the relative time corresponding to the edges of the clock signal and data input signal.

In accordance with an embodiment, the digital phase detector logic 108 may communicate the generated multi-state signal to the digital loop filter 110. The digital loop filter 110 may code the received multi-state signal that corresponds to the phase error information to a binary coded number. In accordance with an embodiment, the phase error information may be coded by use of two's complement representation to generate the binary coded number. Examples of the coding techniques used to code phase error information may include, but are not limited to, one's complement representation, signed binary number representation, and/or unsigned binary number representation.

In accordance with an embodiment, the digital phase detector logic 108 may code the generated multi-state signal prior to the communication of the multi-state signal to the digital loop filter 110. In accordance with an embodiment, the DPLL 100 may further comprise a memory element configured to store the coded phase error information as one or more bits. The one or more bits may represent the binary coded number. For example, the memory element may be a register configured to store the coded phase error information as one or more bits.

In accordance with an embodiment, the digital phase detector logic 108 may be configured to detect whether the value (such as a phase error value) that corresponds to the phase error information is less than or greater than a predetermined threshold value. It may be desirable to minimize the phase error information by pre-setting the predetermined threshold value to a minimum value, such as a value approximately close to zero.

In instances when the value that corresponds to the phase error information is greater than the predetermined threshold value, the digital loop filter 110 may be configured to utilize a plurality of addends to integrate the phase error information. For example, when a loop filter is realized in analog domain, the integration of the phase error information may be achieved with a charge pump and a capacitor. The capacitor's charge may vary as the phase of the controlled clock is compared with the reference, and so the phase information from multiple comparisons may be processed by addition or subtraction of charge from a capacitor by use of the charge pump. In such a case, the voltage on the capacitor may be fed to the VCO 114 as the control signal. However, when a loop filter is realized in the digital domain (such as the digital loop filter 110), the phase error information may be stored as individual bits that may represent a number (such as a binary coded number) in the memory element, such as a register, as described above. The phase error information may be added or subtracted to the value in the register, which may result in the integration of the phase error. The addition or subtraction of the phase error information may be performed by use of an adder, with the plurality of addends. The plurality of addends may be the existing contents of the memory element, such as the register, and/or the incoming phase error information.

In accordance with an embodiment, a first addend of the plurality of addends may correspond to the binary coded number stored in the memory element. Subsequent addends, such as a second addend or a third addend, of the plurality of addends may correspond to incoming phase error information. For instance, the phase error information may be multi-state information, such as three state information instead of a two-state (such as binary), as shown in FIGS. 1B and 1C as an example.

The digital loop filter 110 may be configured to encode the first addend as a first unary number. The encoding may also be referred to as a conversion of the first addend to the first unary number representation. The first unary number may comprise a token bit. The first unary number may correspond to an n-bit wide token that may comprise the token bit. A position of the token bit in the n-bit wide token may indicate a value of the first addend.

In accordance with an embodiment, the digital loop filter 110 may be configured to encode the second addend as a second unary number. The second unary number may represent the incoming phase error information. The digital loop filter 110 may be configured to perform a first shift operation on the token bit in the first unary number, based on the second unary number. The first shift operation may result in the shifting of the token bit by at least one bit position in the n-bit wide token. In accordance with an embodiment, the first shift operation may correspond to a no-shift, a left-shift, or a right-shift operation related to the position of the token bit. The digital loop filter 110 may generate an output unary number based on the first shift operation. In accordance with an embodiment, a shift in position of the token bit in the generated output unary number may indicate an increment or a decrement in a numeric value of the binary coded number that corresponds to the stored and coded phase error information.

In accordance with an embodiment, the digital loop filter 110 may be configured to perform a second shift operation on the position of the token bit in the generated output unary number based on another unary number. In accordance with an embodiment, the other unary number may be a third unary number. The third unary number may also represent the incoming phase error information.

In accordance with an embodiment, the digital loop filter 110 may be configured to determine an update information to generate a control signal for the VCO 114. In accordance with an embodiment, the update information may be based on the position of the token bit in the generated output unary number. The generated control signal may be utilized to adjust the frequency of the VCO 114. The adjusted frequency may be used to update the clock signal that may be generated by the VCO 114.

In accordance with an embodiment, the digital loop filter 110 may be configured to decode the generated output unary number to a number representation similar to the number representation of the first addend and/or the second addend. For example, in a state where the first addend and second addend are represented as two's complement numbers, the generated output unary number may be decoded to the two's complement number representation. Further, the decoded number representation obtained by decoding the generated output unary number may be a number representation that may indicate a summation of the plurality of addends, such as the first addend and the second addend. The summation result obtained may correspond to a count of bits, such as phase error bits, at the time of processing the phase error information generated by, the digital phase detector logic 108, such as a bang-bang phase detector.

In accordance with an embodiment, the DAC 112 may be configured to convert the output unary number from a digital signal to an analog signal. The converted analog signal may act as the control signal for the VCO 114, as described above. In accordance with an embodiment, the VCO 114 may be configured to receive the control signal (in analog form in this case) from the DAC 112. Based on the received control signal, the VCO 114 may adjust the frequency of the oscillator to generate the clock signal that may minimize the incoming phase error information over a plurality of VCO cycles under the control of the digital loop filter 110. The phase error information received by the digital loop filter 110 from the digital phase detector logic 108, may be integrated over time to obtain the recovered data output signal. For instance, when the value of the generated multi-state signal, referred to as phase error, is less than the predetermined threshold value, the DeMUX 106 may be configured to generate a recovered data output signal and a recovered clock signal.

In accordance with an embodiment, the recovered data output signal may have a fixed relation with the phase of an incoming data input signal. The recovered data output signal may have same frequency as the data input signal. In accordance with an embodiment, the recovered data output signal may have a frequency that may be a multiple of the data input signal frequency. The recovered data signal may be used as a control signal for other parts of an electronic device that may use the integrated circuit, such as the DPLL 100. Example of the application of the recovered data output signal and/or recovered clock signal may include, but not limited to, FM demodulator circuits, signal re-constitution circuits, clock recovery and/or frequency synthesis.

In accordance with an exemplary aspect of the disclosure, the integrated circuit is shown implemented as the DPLL 100 to describe processing of the plurality of addends. However, there are a number of applications that require data processing operations to be performed on a large quantity of small numbers (such as addends). These applications include, but are not limited to, a DPLL, such as the DPLL 100 as described above, a multiply-accumulate circuit (MAC) for Digital Signal Processors (DSP), and also used in circuits that require transmission of high speed data or for the generation of high frequency clock sources. Other applications that require data processing operations to be performed on a large quantity of small numbers (such as addends) include audio recognition, speech recognition, and also in the fields of radar, and/or geology Both of these applications rely on processing, such as summation, of multiple addends and other established techniques to perform the required operation.

Typical metrics of the processing performance of an IC are power, area, and latency, with the goal to minimize each for a given data processing operation. In conventional techniques, most of the digital ICs may perform data processing operations on a single pair of numbers at a time. The data processing operations may be tailored to handle large numbers that require numerous bits for representation. In certain scenarios, when the data processing operations requires a large quantity of small numbers (such as addends), the conventional data processing techniques may incur penalties to processing performance related to latency, power, and area. For example, to process the various bits of phase error information generated by the digital phase detector logic 108, a data processor may involve a continuous tally of the incoming phase error information. The data processor may perform data processing operation as soon as the phase error information becomes available. Hence, a latency may be involved in the conventional techniques as compared to present disclosure. Moreover, the power consumption of complementary metal-oxide semiconductor (CMOS) logic increases linearly with frequency.

Various embodiments of the disclosure may encompass numerous advantages. Large amount of power may be saved by de-multiplexing the high speed, serial data signals to low-speed, parallel data signals. The low-speed data signals may further reduce the power consumption. For example, when the processing speed is reduced by half, the power consumption may reduce by a factor of two. In accordance with an embodiment, the method or system may be optimized such that various operations are configured to be performed in parallel. In accordance with an embodiment, the use of a simple, unary number representation system, as described above and in the various embodiments of the disclosure, allows a simpler complexity of circuit and a lower latency implementation. Further, as discussed, the method or system disclosed may be configured to dissipate lower power as compared to conventional techniques.

Conventional data processing techniques by use of conventional adders, such as a half adder, a full adder, a ripple adder, a carry look-ahead adder, and/or a parallel adder, may incur penalties to processing performance related to latency, power, and/or area. For example, the half adder may be a circuit that accepts two single bit input values and outputs binary sum of the input values. The half adder circuit may be limited, as the output may be the same for the input values "0+0" or the input values "1+1". The full adder is an extension of the half adder that has carry-in (input) and carry-out (output) signals.

In another example of a conventional adder, the ripple adder may use a number of full adders in parallel (one ripple adder for each bit of the input numbers being summed) to determine summation of two large numbers at a time. Thus, an n-bit summation requires "n" full-adders. The carry out signal from the "0th" bit operation is sent to the carry-in input of the first bit operation. Accordingly, the next carry-out output may be sent to the next full adder, and so on. In case of ripple adder, to add two n-bit numbers together, the carry signals must propagate through all "n" full-adders. This means that the time to execute the operation increases linearly with the number of bits in the input addends that may not be desirable.

In another example of a conventional adder, the carry look-ahead adder, known in the art, may improve on the latency of the ripple adder while adding very large (wide) numbers. In the carry look-ahead adder circuit, the carry-in signals of the most significant bits are computed based on each pair of input bits, and do not require the carry signal to propagate through all n-bits for an n-bit addition. For each bit pair, a pair of signals, referred to as a propagate signal and a generate signal, may be created. The propagate signal may be asserted when a carry-out results from a carry-in. The generate signal may be asserted when a carry-out results in any condition. The carry-in signal for each full-adder may be a function of the propagate signals and the generate signals for each of the less significant bits of the addends. Although, this reduces the latency of the addition operation, but requires a larger circuit area and power than the ripple adder.

None of the conventional adders, such as the half adder, the full adder, the ripple adder, and the carry look-ahead adder, as mentioned are designed to add many single-bit numbers in parallel. A certain configuration of the carry look-ahead adder may add many parallel bits. For instance, for "m" input values, "m/3" full adders may be required at the input, and a depth of "log 2 (m)" adders may be required to convert from many small "1 bit" numbers to a "log 2 (m) bit" binary representation of the sum. This configuration of circuit, again, incurs a large penalty to area and latency because of the large number of full adders that are required to perform the data processing operations. To optimize the processing performance related to latency, power, and/or area, the disclosed system and method provides an efficient mechanism to process data in an improved adder, such as the disclosed exemplary adders and associated data processing techniques (as described in FIGS. 1A, 1B, 1C, 2A, 2B, 3A to 3C, 4A to 4G, 5A, 5B, and 6 to 9B).

In addition to the above mentioned applications, the disclosed system and method may also find application in optical processing elements, such as an integrated computational element (ICE) core, used in optical computing devices. For example, various industries (such as oil and gas industry, paint industry, pharmaceutical industry, and cosmetics industry) that require to analyse, monitor, and/or detect chemical substances (such as hydrocarbons, drilling fluids, and completion fluids) utilize optical processing elements (such as the ICE cores). Various performance factors, such as standard error of calibration (SEC) of large number of ICE core designs, need to be calculated during designing, evaluation, and fabrication of optical processing elements (such as the ICE cores). The disclosed system and method may be advantageously used in such designing, evaluation, and fabrication by performing data processing operations on a large quantity of small numbers (such as addends) in parallel and in optimized manner.

Further, it is known that use of optics in data processing may have an advantage of parallelism and wide bandwidths. However, a need to interface such optics based solutions with electronic circuits usually creates a limitation which nullifies the inherent advantages of the use of optics in data processing. The disclosed system and method may overcome such limitation to provide an adequate electronic circuit interface to optimize the processing performance in the disclosed improved adders. Further, the disclosed system and method may also find application in quantum computing that require quick processing of quantum bits (qubits). The use of a simple, unary number representation system and the token bit shifting mechanism, as described above and in the various embodiments of the disclosure, may allow a simpler complexity of circuit and a lower latency implementation suited for use in quantum computing.

FIGS. 1B and 1C are block diagrams that illustrate signal flow with regards to DeMUX, phase detector logic and digital loop filter in an integrated circuit for implementation of the disclosed system and method, in accordance with an embodiment of the disclosure. FIGS. 1B and 1C have been described in conjunction with elements from FIG. 1A. With reference to FIG. 1B, there is shown a first exemplary communicative connection $100b$ between the digital phase detector logic 108 and the digital loop filter 110. There is further shown the DeMUX 106.

The DeMUX 106 may communicate sampled input signals. In accordance with the communicative connection $100b$, each of the individual phase error addends, such as "pe0", "pe1", and "pe2", may be computed by the digital phase detector logic 108 for each received sample, as shown. The individual phase error addends may be represented by three state signal, such as "$\{-1, 0, +1\}$". The digital phase detector logic 108 may be further configured to compute a sum of the individual phase error addends. In accordance with an embodiment, the signal range of the sum of the individual phase error addends over three cycles may be $\{-3, -2 \ldots +2, +3\}$. The digital phase detector logic 108 may be further configured to communicate the computed sum to the digital loop filter 110. The digital loop filter 110 may be configured to receive the computed sum and accumulates the phase error (integration). Such an accumulated phase error may be equivalent to a phase error associated with a capacitor and a charge pump in a conventional analog charge pump.

With reference to FIG. 1C, there is shown a second exemplary communicative connection 100c between the digital phase detector logic 108 and the digital loop filter 110. There is further shown the DeMUX 106. In accordance with the communicative connection 100c, each of the individual phase error addends, such as "pe0", "pe1", and "pe2", as shown. As described in FIG. 1B, the individual phase error addends may be represented by a multi-state signal, such as a three-state signal "{−1, 0, +1}". The digital phase detector logic 108 may be further configured to communicate the individual phase error addends to the digital loop filter 110. The digital loop filter 110 may be configured to receive the individual phase error addends and accumulates the phase error. As described in FIG. 1B, such an accumulated phase error may be equivalent to a phase error associated with a capacitor and a charge pump in a conventional analog charge pump.

Figure 2A:
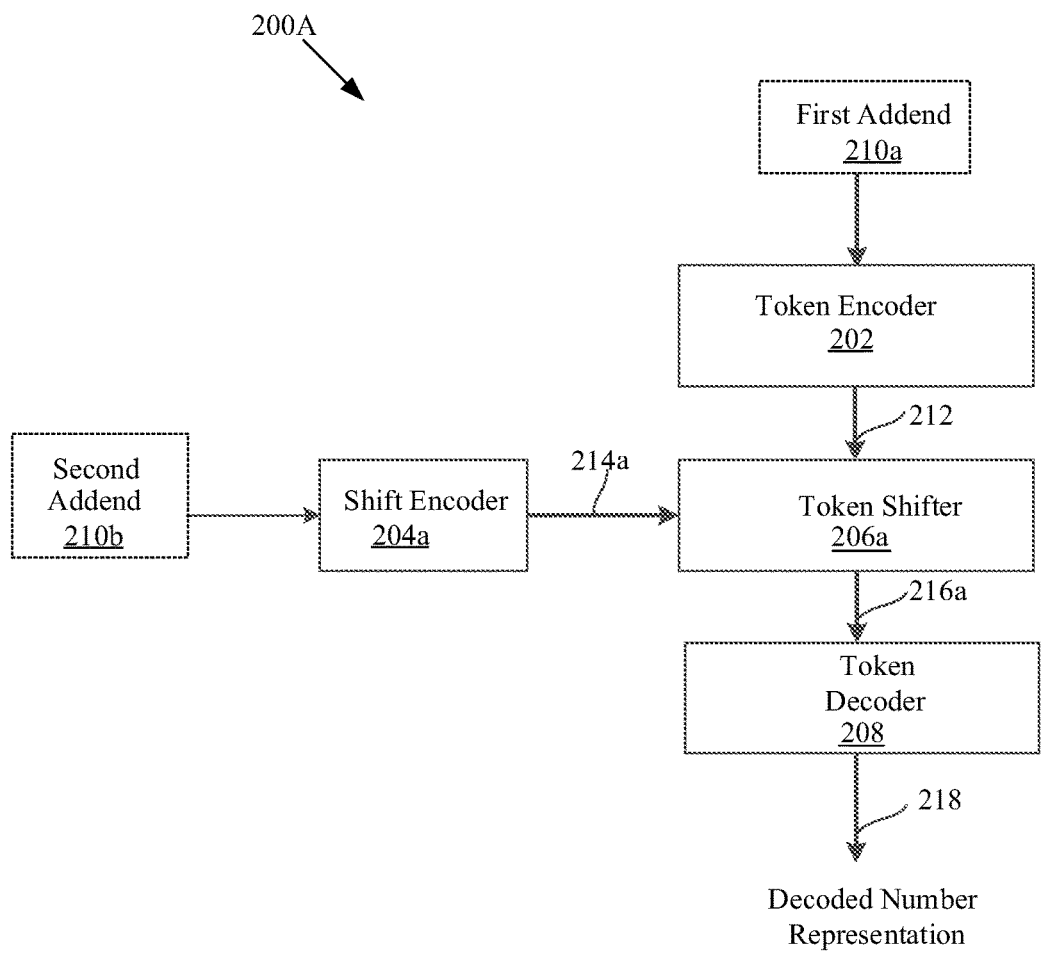
FIGS. 2A and 2B are block diagrams that illustrate exemplary circuit architectures of an adder, in accordance with an embodiment of the disclosure.
Figure 2B:
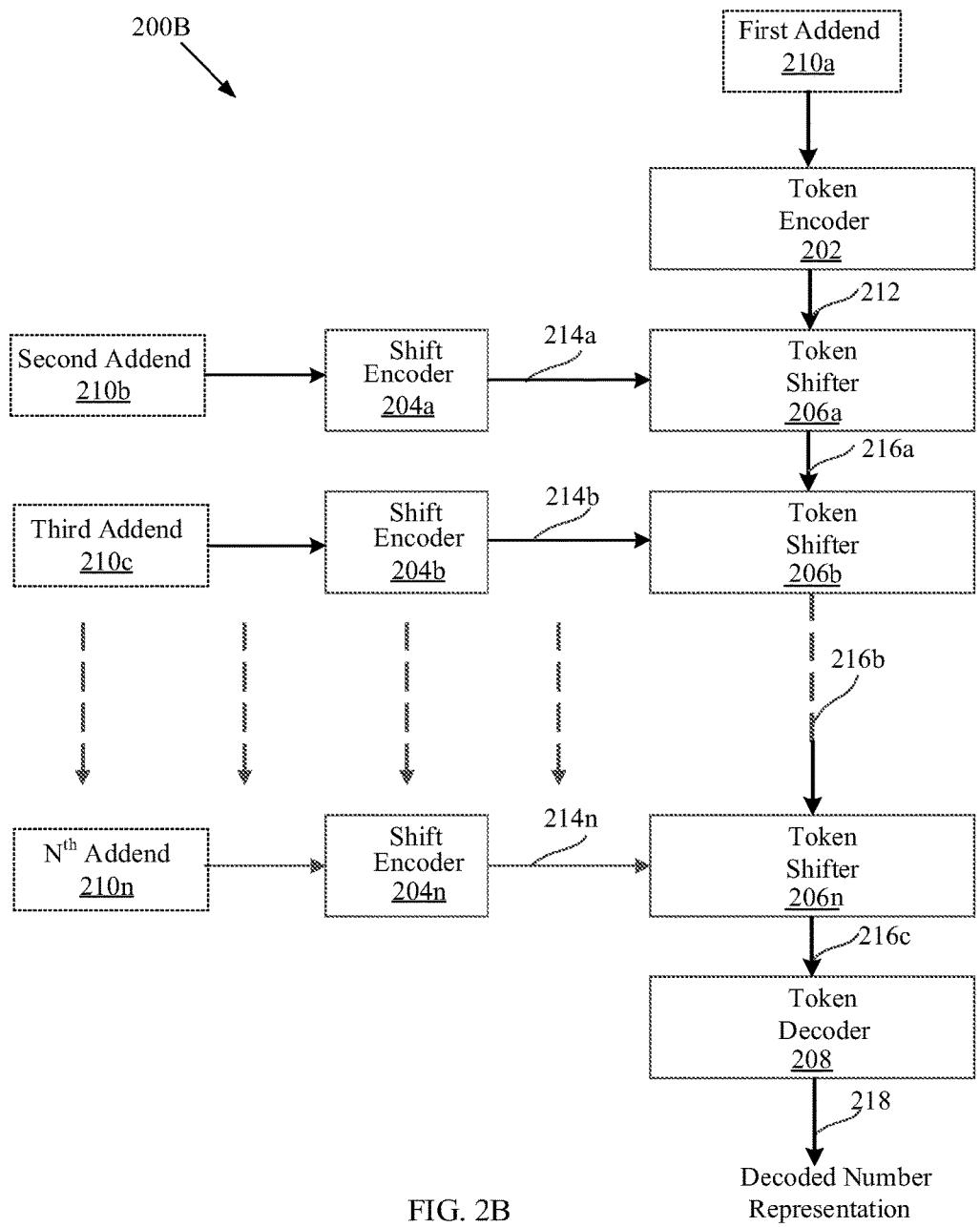

FIGS. 2A and 2B are block diagrams that illustrate exemplary circuit architectures of an adder, in accordance with an embodiment of the disclosure. FIGS. 2A and 2B have been described in conjunction with elements from FIGS. 1A to 1C. With reference to FIG. 2A, there is shown an exemplary adder 200A. The adder 200A may include a token encoder 202, a shift encoder 204a, a token shifter 206a and a token decoder 208. There is further shown a first addend 210a, a second addend 210b, a first unary number 212, a second unary number 214a, an output unary number 216a, and a decoded number representation 218. In accordance with an embodiment, the adder 200A may be implemented in the digital phase detector logic 108 and/or the digital loop filter 110 of the DPLL 100, as described in FIG. 1A, to process the plurality of addends. Notwithstanding, the adder may be used or implemented in other ICs, such as a digital delay locked loop (DDLL), multiply-accumulate (MAC) circuits for digital Signal processors (DSP), used to process data on field programmable gate arrays (FPGAs), a graphics processing unit (GPU), a microprocessor, a microcontroller, a data converter, used in one or more multiplier circuits in arithmetic logic unit (ALU), and/or subtracting circuits in application specific integrated circuits, without limiting the scope of the disclosure.

The token encoder 202 may comprise a suitable logic, circuit, logic gate, arithmetic logic unit (ALU), and/or interfaces that may be configured to encode the existing content, such as a binary coded number, of the memory element (such as the register) to a unary number representation. For instance, the token encoder 202 may encode the stored binary phase information, such as the first addend 210a, to the first unary number representation 212. In other words, the encode operation of the stored binary phase information may refer to conversion of the input binary coded number to be represented as the unary number. In accordance with an embodiment, the first unary number 212 may comprise a token bit. The token encoder 202 may be implemented using a combinational logic circuit design. In an implementation, the token encoder 202 may be a log token encoder to enable addition of logs.

The shift encoder 204a may comprise a suitable logic, circuitry, logic gate, ALU, and/or interfaces that may be configured to encode the incoming phase error information, such as the second addend 210b, to the second unary number representation. In other words, the encode operation of the incoming phase error information may refer to conversion of the coded phase error information to be represented as the second unary number 214a. In an implementation, instead of generating an effect of addition or subtraction, the shift encoder 204a, may act as a multiplier of the plurality of addends.

The token shifter 206a may comprise suitable logic, circuitry, a logic gate, ALU, and/or interfaces that may be configured to perform a first shift operation on the token bit in an input unary number, such as the first unary number 212, based on another unary number, such as the second unary number 214a. The shift operation may generate the output unary number 216a.

The token decoder 208 may comprise suitable logic, circuitry, a logic gate, ALU, and/or interfaces that may be configured to decode the generated output unary number 216a to a number representation that corresponds to the first addend 210a and the second addend 210b. The decoded number representation 218 may indicate a summation of the first addend 210a and the second addend 210b. In accordance with an embodiment, the function of the token decoder 208 may be realized using a combinational logic design.

In operation, the token encoder 202 may encode the first addend 210a to obtain the first unary number 212. The input first addend 210a may be a two's complement binary number representation. A person having ordinary skill in the art should understand that the scope of the present disclosure may not be limited to representation of the first addend 210a by use of two's complement representation. The first addend 210a may take the form of unsigned binary, signed binary, 1's complement binary, one-hot encoding, or other number representation system suitable for the application in which the adder 200A may be utilized.

In accordance with an embodiment, the token encoder 202 may encode the input first addend 210a, which may be represented as a two's complement number, to the first unary number 212. In accordance with an embodiment, the shift encoder 204a may encode the input second addend 210b, which may be represented as a two's complement number, to the second unary number 214a.

In accordance with an embodiment, the first unary number 212 may comprise a token bit. For example, the first unary number 212 may comprise a single bit value "1" as the token bit. All other bit values of the first unary number 212 may be "0". In accordance with an embodiment, the first unary number 212 may comprise a single "0" as the token bit. All other bit values of the first unary number 212 may be "1". Thus, the token bit may be a unique bit value among the bit values of the encoded (or converted) unary numbers, such as the first unary number 212. The position of the token bit in the n-bit wide token may represent the value of the first unary number 212.

In an implementation, the first unary number 212 may also take the form of a thermometer code. The thermometer code may be formed by a string of consecutive "1"s and a string of consecutive "0"s. In such a case, the token bit may be represented by the position of the boundary between a string of "0"s and a string of "1"s. The token bit may be represented by the position of "1" after immediate transition from "0" to "1" in the thermometer code. In accordance with an embodiment, the thermometer code may be formed by a string of consecutive 0's and a string of consecutive 1's. In such a case, the token bit may be represented by the position of "0" after immediate transition from "1" to "0" in the thermometer code. The position of the token bit may represent the value of the first unary number 212.

In accordance with an embodiment, the first unary number 212 may comprise of multiple token bits instead of one token bit. In accordance with an embodiment, the multiple token bits may be utilized to represent a multi-valued digit. For example, the number to be represented by the first unary number 212 may contain two orthogonal components, such as a complex number. The complex number may include a real part and an imaginary part. The real part may be represented by the token bit while the imaginary part may be represented as an analog voltage. In a case in which the first unary number 212 represents a complex number, the data processing operations, such as the addition or subtraction, will affect only the real part whereas the imaginary part may remain unchanged.

Figure 7:
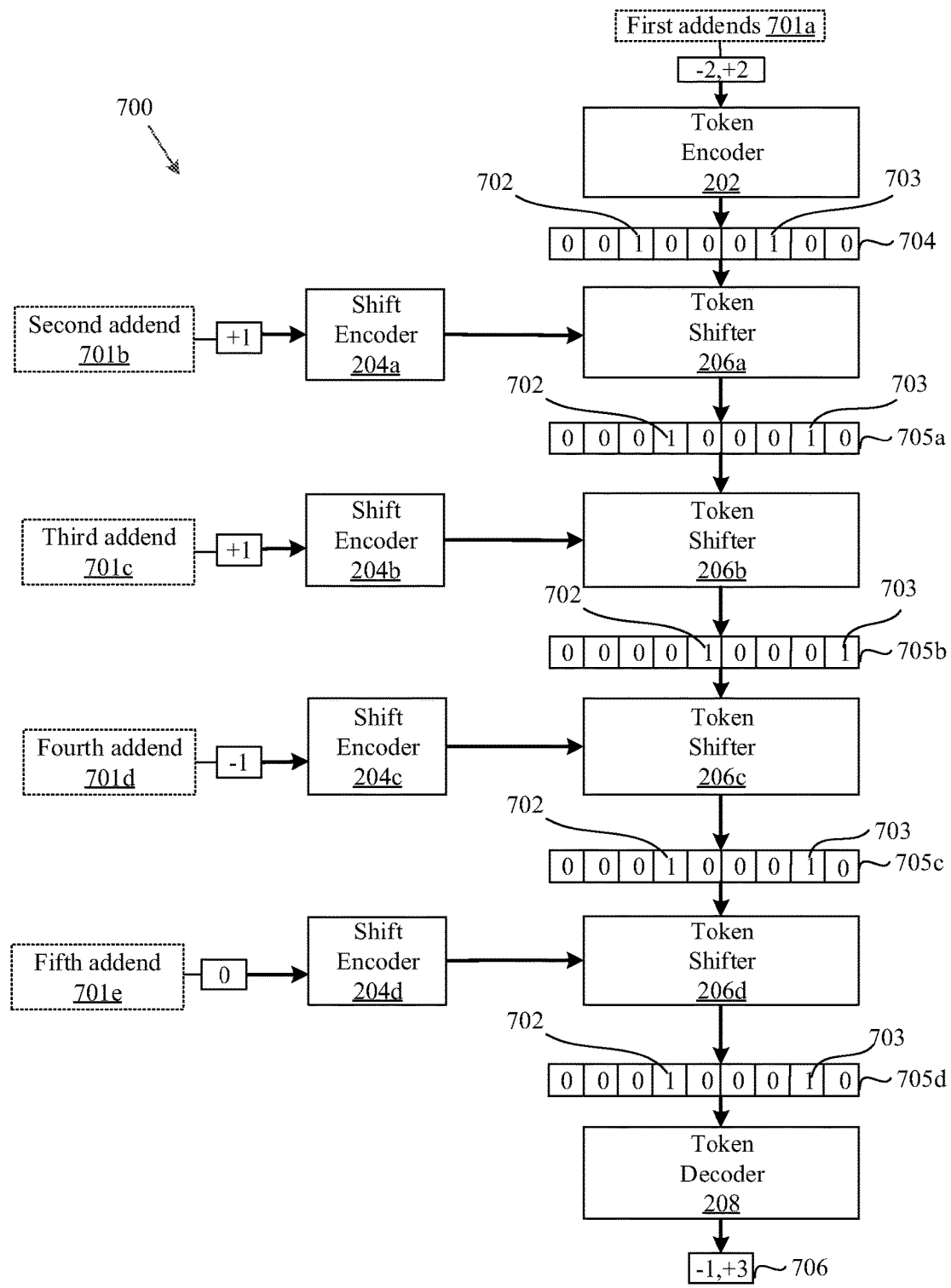
FIG. 7 illustrates a third exemplary scenario for implementation of the disclosed system and method to process data in an adder based circuit, in accordance with an embodiment of the disclosure.

In accordance with an embodiment, the multiple token bits in the first unary number 212 may describe multiple numbers and conduct arithmetic operations on a group of numbers, represented by the multiple token bits, simultaneously (as described in FIG. 7). For example, two numbers may be represented simultaneously by two token bits in the first unary number 212. A person having ordinary skill in the art will understand that the number of token bits in the first unary number 212 is exemplary. The same n-bit wide input token (physically represented by same set of wires) that corresponds to the first unary number 212 may hold multiple, non-identical numbers because the number may be represented by the position of the token bits, and not the state of all the wires together.

With reference to FIG. 2B, there is shown another exemplary adder 200B. The adder 200B may be similar to that of the adder 200A. The adder 200B may comprise the elements of the adder 200A, such as the token encoder 202, the shift encoder 204a, the token shifter 206a, the token decoder 208, and additional instances of such elements as per requirement (as shown). For example, when additional addends, such as a third addend 210c to a $n^{th}$ addend 210n, are to be processed, additional shift encoders 204b to 204n and corresponding token shifters 206b to 206n, may be employed for every addend, as shown in FIG. 2B.

In accordance with an embodiment, the adder 200B may be configured to perform summation of the plurality of addends 210a to 210n. The summation of the plurality of addends may be performed by adding a shift encoder and a corresponding token shifter, as described in FIG. 2B, corresponding to every additional input addend. With each additional addend, the width of the output token that corresponds to the generated output unary numbers, such as the output unary number 216a to the output unary number 216n, may be increased in each shift operation to allow the full range of expected number that may be represented by the summation of input addends.

FIGS. 3A, 3B, and 3C illustrate data processing operation related to encoding of addends in an adder based circuit, such as in the adder 200A or the adder 200B, in accordance with an embodiment of the disclosure. FIGS. 3A, 3B, and 3C have been described in conjunction with elements from FIGS. 1A, 1B, 1C, 2A, and 2B. With reference to FIG. 3A, there is shown an exemplary truth table that depicts a data processing operation to encode the first addend 210a to the first unary number 212, in accordance with an embodiment of the disclosure.

The first addend 210a may be the n-bit wide number that may be physically represented by multi-state signals on a set of n-number of wires. In this case, as the first addend 210a is a two's complement, and a 3-bit binary coded number, the first addend 210a may represent a maximum of "$2^3$" combinations. In accordance with an embodiment, the "$2^3$" combinations may represent a range of eight numbers having decimal values from "−4 to +3" in the example, as shown in FIG. 3A.

In accordance with an embodiment, the input first addend 210a may be encoded in another form of number representation and the size of the binary coded number may be variable n-bit wide number, where "n" may be any positive integer value. Based on the size of n-bit wide binary coded number, the range of numbers represented by the first addend 210a may be varied.

In accordance with an embodiment, the first addend 210a may be encoded (or converted) to the first unary number 212. The output of the token encoder 202 may be the first unary number 212 that may be an 8-bit wide encoded output, physically represented by multi-state signals on 8 wires. The first unary number 212 may be physically represented as a binary voltage in one of the 8 wires (depicted by "$a_{-4}$ to $a_3$" in FIG. 3A). One of the bits in the 8-bit wide first unary number 212 (that may be the output of token encoder 202) may be "1", while the remaining (n−1) bits are stuffed with "0", as shown in FIG. 3A. The bit position in the first unary number 212 that represents a "1" may be referred to as the token bit. The value of the first unary number 212 may be represented by the position of the token bit "1" (the unique token bit with bit value "1") in the 8-bit wide token (or in the first unary number 212).

In accordance with an embodiment, as described above, as the first unary number 212 may also be physically represented by multi-state signals on 8 wires, one wire of the 8 wires may carry a "1" voltage. The wire having the "1" voltage may represent an individual number. In accordance with an embodiment, the 8 wires may represent eight individual numbers, such as "−4, −3, −2, −1, 0, +1, +2, +3". In accordance with an embodiment, the number that the first unary number 212 represents may be indicated by the position of the token bit in an array of 8-wires, as shown.

In accordance with an embodiment, instead of representing the range of numbers as "−4, −3, −2, −1, 0, 1, 2, 3", the range of numbers represented by the position of token bit may include, but are not limited to, a range of consecutive whole numbers, such as "0, 1, 2, 3, 4, 5, 6, 7", a range of consecutive negative integers, such as "−8, −7, −6, −5, −4, −3, −2, −1", a range of even numbers, such as "0, 2, 4, 6, 8, 10, 12, 14", a range of random whole numbers, such as "0, 1, 3, 4, 5, 6, 7, 9", and/or a range of numbers representing power-of-2, such as "1, 2, 4, 8, 16, 32, 64, 128", and the like.

With reference to FIG. 3B, there is shown a truth table for another exemplary encoding technique of the first unary number 212. In accordance with an embodiment, the first unary number 212 may be represented in the form of a typical thermometer code. The thermometer code may be formed by a string of consecutive "1's" and a string of consecutive "0's". In such a case, the token bit may be represented by the position of the boundary between a string of "0" (multiple consecutive bits with bit value "0") and a string of "1" (multiple consecutive bits with bit value "1"). Alternatively, the token bit may be represented by the position of the transition from "0" to "1" in the thermometer code. The position of the token bit may represent the value of the first unary number 212. In accordance with an embodiment, the value of the number represented by the first unary number 212 may be indicated by the position of the token bit in the first unary number 212. In accordance with an embodiment, there may be one transition from "1" to "0". The transition from bit values "1" to "0" may represent an individual number.

With reference to FIG. 3C, there is shown a truth table for an exemplary encoding technique of the second addend 210b. The shift encoders 204a to 204n (FIGS. 2A and 2B) may implement a similar conversion method as the token encoder 202. In accordance with an embodiment, the shift encoder 204a may be configured to encode the second addend 210b to the second unary number 214a. In accordance with an embodiment, one of the bits in the 3-bit encoded second unary number 214a (that may be the output of shift encoder 204a) may be "1", while the remaining (n−1) bits are "0" values. The bit value in the second unary number 214a that represents a "1" may be referred as the token bit. In accordance with an embodiment, the value of the number represented by the encoded second unary number 214a may be indicated by the position of the token bit of the second unary number 214a.

In an implementation, the shift encoder 204a may receive the input second addend 210b, as a 2-bit wide binary coded number. The 2-bit wide binary coded number may be physically represented by a signal on 2 wires. Further, the second unary number 214a may be physically represented by a signal on 3 wires. In accordance with an embodiment, all the 3 wires may represent three individual numbers. In accordance with an embodiment, only one wire may carry a "1" voltage. The wire having the "1" voltage may represent an individual number. The number that the second unary number 214a represents may be described by the position of the token bit in the array of 3-wires.

In accordance with an embodiment, the second unary number 214a may be represented in the form of a two's complement, 2-bit binary coded number and the output of the shift encoder 204a may be a 3-bit wide encoded output. In this case, the shift encoder 204a may utilize 3 combinations to represent a range of three numbers having decimal values from "−1 to 1", as shown in FIG. 3C. Notwithstanding, similar to the first addend 210a, the second addend 210b may be encoded in any other form of number representation, such as two's complement number representation, without limiting the scope of the disclosure. In accordance with an embodiment, the size of the binary coded number may be an m-bit number, where "m" may be any positive integer value. Based on the size of m-bit binary coded number, the range of numbers represented by the second addend 210b may be varied.

Figure 4A:
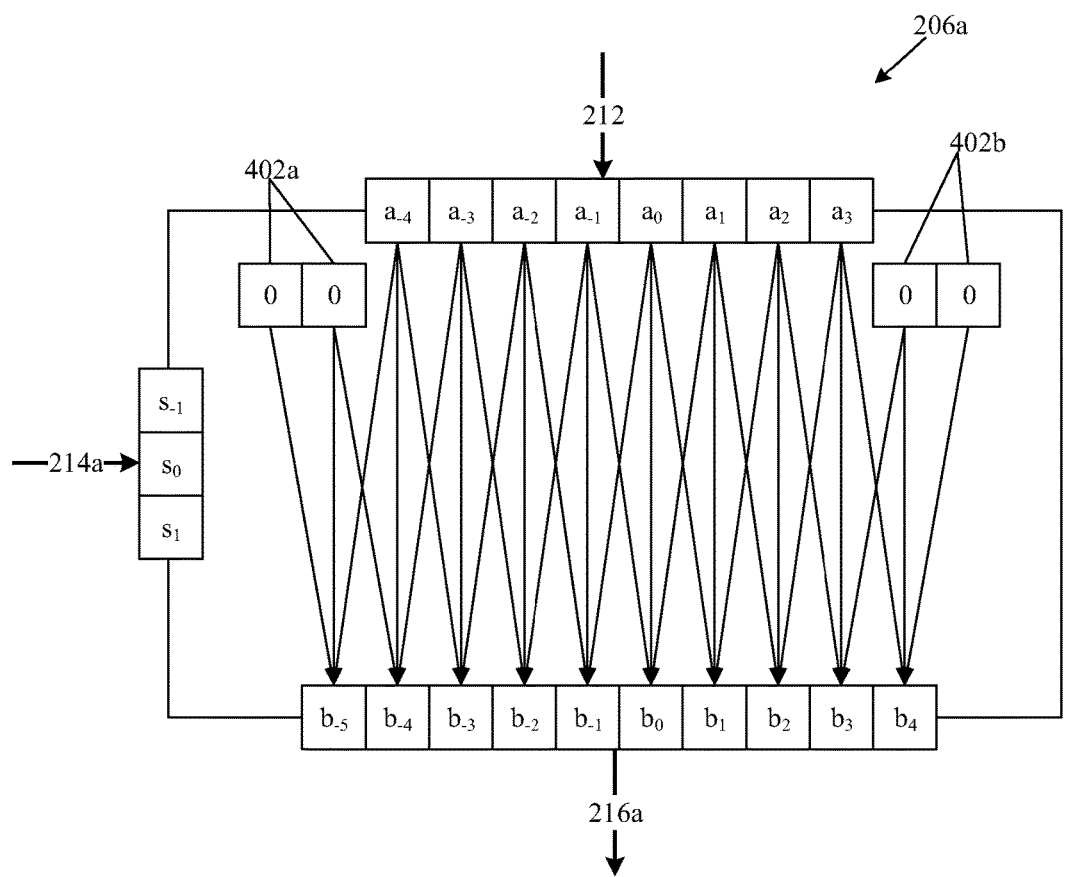

FIGS. 4A to 4G illustrate data processing operation related to shift operation mechanism in an adder, such as the adders 200A and 200B, in accordance with an embodiment of the present disclosure. FIGS. 4A to 4G have been described in conjunction with elements from FIGS. 1A, 1B, 1C, 2A, 2B, 3A, 3B, and 3C. With reference to FIG. 4A, there is shown a first exemplary token shifter, such as the token shifter 206a, to explain the shift operation mechanism. There is further shown the first unary number 212, the second unary number 214a, dummy wires 402a and 402b, and an output unary number 216a. The token shifter 206a may be configured to perform the shift operation by use of a simple switch matrix, as shown in the FIG. 4A.

The first unary number 212, which corresponds to the n-bit wide input token, may include the token bit, such as "1". The dummy wires 402a and 402b may be configured to hold invalid dummy bits, such as all "0" bit values that may be different from the bit value of the input token bit, such as "1". The dummy wires 402a and 402b may be provided to ensure that the output token, physically represented by 10 wires, such as "$b_{-5}$ to $b_4$", as shown, always have a routing source. The output token may correspond to the output unary number 216a. The output unary number 216a may be 10-bit (n+2) wide output token that may be an expanded token output due to the shift operation.

In operation, the token shifter 206a may be configured to route the input token bit of the first unary number 212 to the output by applying a no-shift, a left-shift, or a right-shift based on the second unary number 214a. In other words, the token shifter 206a may route the input token bit under the direction of the input of the shift encoder 204a.

In accordance with an embodiment, in the unary number representation system, the token shift operation in the left or right direction may correspond to an increment or decrement of the value of the input number on which the shift operation is performed. In accordance with an embodiment, the shifting operation may involve shift of the token bit in the first unary number 212 by multiple bit location, based on the second unary number 214a. In such cases, a token shift operation in the left or right direction by multiple bit locations may correspond to a multiplication or division of the value of the number at which the shift operation may have been performed.

In accordance with an embodiment, an increase in the number of bit locations (physically represented by increase in the number of wires) of output unary number 216a may occur due to the shift operation. The increase in the number of bit locations (or wires) of output unary number 216a may be due to the fact that the set of numbers that may be realized by the addition of first addend 210a and second addend 210b has increased. For instance, in this case, the range of first addend 210a may be from "−4 to +3" and the range of second addend 210b may be from "−1 to +1". The addition of the first addend 210a and the second addend 210b may increase the range to "−5 to +4". Thus, the output token width that corresponds to the generated output unary number 216a may be expanded in order to capture the full range of numbers. In accordance with an embodiment, during the subsequent cycles of the shift operation, the size of the n-bit wide input token after each shift operation may increase.

Figure 4B:
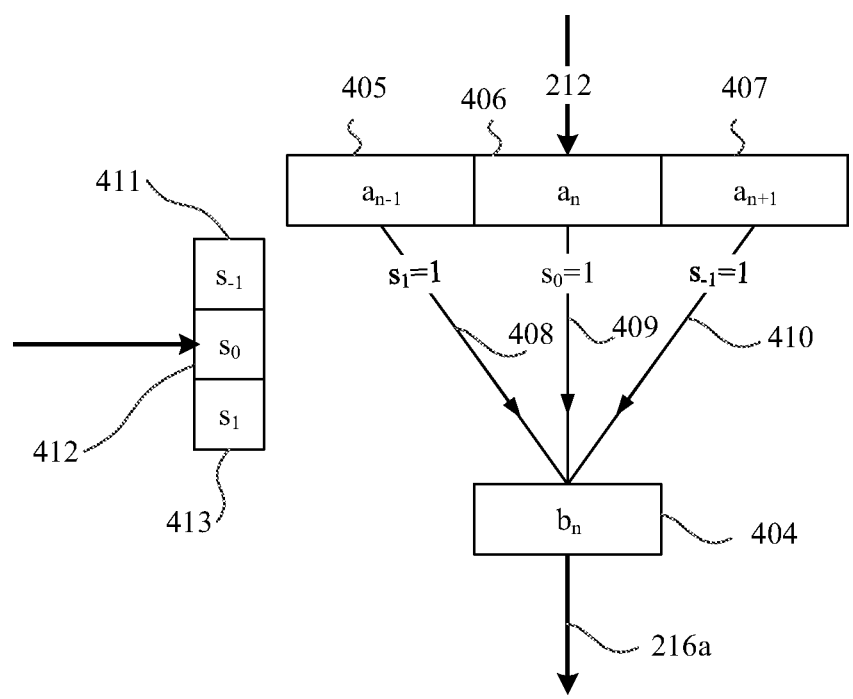

FIG. 4B shows an exemplary portion of the switch matrix of the token shifter 206a of FIG. 4A to further describe the shifting mechanism, in accordance with an embodiment of the disclosure. With reference to FIG. 4B, there is shown an $n^{th}$ output wire 404 of the token shifter 206a, input wires 405 to 407 of the token shifter 206a, routing paths 408 to 410, and input wires 411 to 413 of the shift encoder 204a.

The $n^{th}$ output wire 404 of the token shifter 206a may be one of the wires that carries the binary voltage or that represents the final position of the token bit in the output token that corresponds to the output unary number 216a. Each output wire of the token shifter 206a, such as the $n^{th}$ output wire 404, may have three input wires 405 to 407 routed to it, as shown by three incoming arrows towards the $n^{th}$ output wire 404 in both FIGS. 4A and 4B. A thick arrow mark shown at the input wire 406 may represent the position of the input token bit in the first unary number 212. The routing paths 408 to 410 may be implemented as switches but may also be realized as switches with buffers. Notwithstanding, the routing paths 408 to 410 may be implemented by any other suitable routing method, without limiting the scope of the disclosure.

In operation, when the input wire 411 is active, then the token bit is routed by the input wire 405 to the $n^{th}$ output wire 404 by use of the routing path 408. Similarly, when the input wire 412 is active, then the token bit (or the "1" voltage) is routed by the input wire 406 to the $n^{th}$ output wire 404 by use of the routing path 409. Finally, when the input wire 413 is active, then the token bit is routed by the input wire 407 to the $n^{th}$ output wire 404 by use of the routing path 410. In accordance with an embodiment, when one of the input wires 411 to 413 of the shift encoder 204a is active, it denotes that the active input wire carries the binary voltage, or represents the position of the token bit, such as "1", in the second unary number 214a.

Figure 4C:
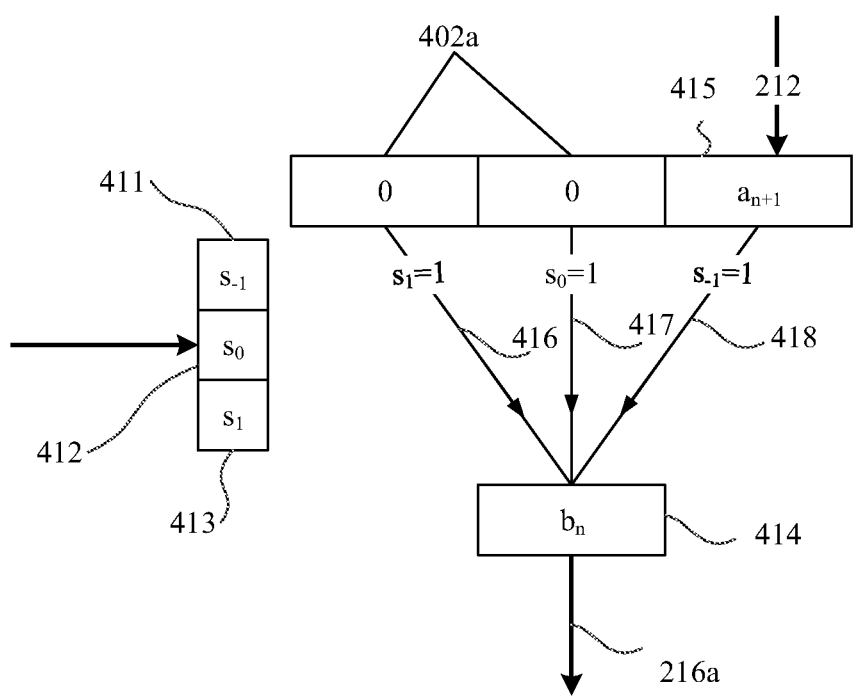

FIG. 4C shows another exemplary portion of the switch matrix of the token shifter 206a of FIG. 4A to further describe the shifting mechanism associated with one end of the output token, in accordance with an embodiment of the disclosure. With reference to FIG. 4C, there is shown an $n^{th}$ output wire 414 of the token shifter 206a. The $n^{th}$ output wire 414 may be located at one of the ends (such as a leftmost end wire) of the output wires (such as "$b_{-5}$ to $b_4$") of the token shifter 206a (FIG. 4A). There is further shown the dummy wires 402a, an input wire 415 of the token shifter 206a, routing paths 416 to 418, and the input wires 411 to 413 of the shift encoder 204a.

The $n^{th}$ output wire 414 of the token shifter 206a may be an end wire, associated with the dummy wires 402a. The thick arrow mark shown at the input wire 415 may represent the position of the input token bit of the first unary number 212. The routing paths 416 to 418 may be similar to the routing paths 408 to 410, and may be implemented as switches. The shifting mechanism at both ends of the output token (such as the leftmost end wire "$b_{-5}$" and the rightmost end wire "$b_4$", as shown in FIG. 4A in this case) may require a different routing mechanism, as described below.

In operation, the token bit of the first unary number 212 is routed by the input wire 415 to the $n^{th}$ output wire 414 by use of the routing path 418 when the input wire 411 is active. The dummy wires 402a may be stuffed with "0" bit values. The input n-bit wide token, represented by the input wires (such as 8 wires "$a_{-4}$ to $a_3$" in this case) may be artificially widened within the token shifter 206a by use of the dummy wires 402a to ensure that the output wires (such as 10 wires "$b_{-5}$ to $b_4$" in this case) of token shifter 206a always have a routing source. The artificial widening of the input wires (such as 8 wires "$a_{-4}$ to $a_3$" in this case) of the token shifter 206a by use of the dummy wires 402a may occur to accommodate the widening of the output unary number 216a (that may be referred to as the (n+2)-bit wide output token) compared to the input first unary number 212 (that may be referred to as the input n-bit wide token).

Figure 4D:
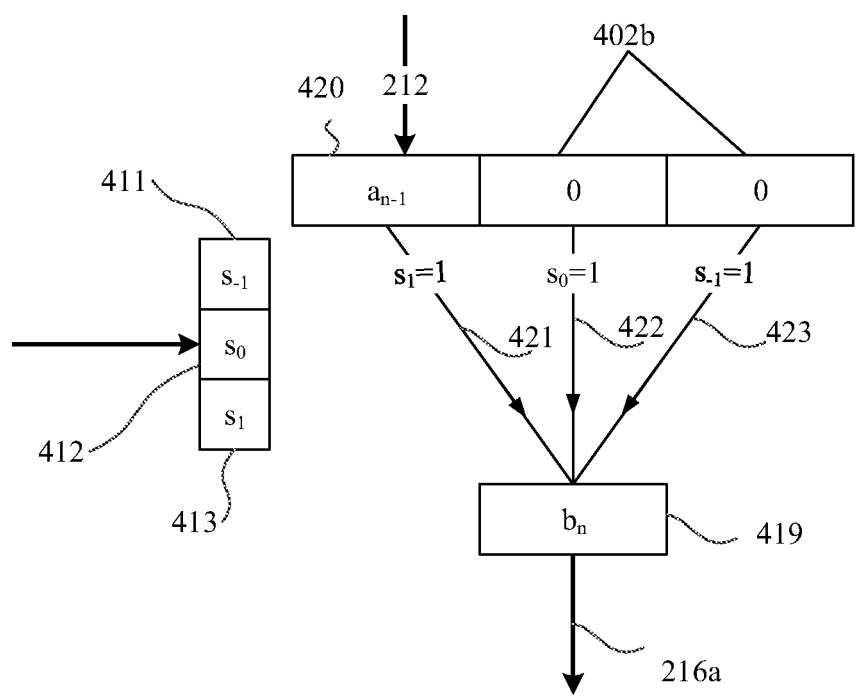

FIG. 4D shows another exemplary portion of the switch matrix of the token shifter 206a of FIG. 4A to further describe the shifting mechanism associated with other end of the output token, in accordance with an embodiment of the disclosure. With reference to FIG. 4D, there is shown an $n^{th}$ output wire 419 of the token shifter 206a. The $n^{th}$ output wire 419 may be located at other end (such as a rightmost end wire) of the output wires (such as "$b_{-5}$ to $b_4$") of the token shifter 206a. There is further shown the dummy wires 402b, an input wire 420 of the token shifter 206a, routing paths 421 to 423, and the input wires 411 to 413 of the shift encoder 204a.

The $n^{th}$ output wire 419 of the token shifter 206a may be an end wire, associated with the dummy wires 402b. The thick arrow mark shown at the input wire 420 may represent the position of the input token bit of the first unary number 212. The routing paths 421 to 423 may be similar to the routing paths 408 to 410 or the routing paths 416 to 418, and may be implemented as switches.

In operation, the token bit is routed by the input wire 420 to the $n^{th}$ output wire 419 by use of the routing path 421 when the input wire 413 is active. The dummy wires 402b may be stuffed with "0" bit values. The input n-bit wide token, physically represented by the input wires (such as 8 wires "$a_{-4}$ to $a_3$" in this case) may be artificially widened within the token shifter 206a by use of the dummy wires 402b. The widening occurs to ensure that the $n^{th}$ output wire 419 (the rightmost end wire of the output wires, such as 10 wires "$b_{-5}$ to $b_4$" in this case) of token shifter 206a always have a routing source. The artificial widening of the input wires of the token shifter 206a by use of the dummy wires 402b may occur to accommodate the widening of the output unary number 216a (that may be referred to as the (n+2)-bit wide output token) compared to the input first unary number 212 (that may be referred to as the input n-bit wide token).

FIG. 4E shows an exemplary truth table of the switch matrix of the token shifter 206a of FIG. 4A to further describe the shifting mechanism, in accordance with an embodiment of the disclosure. With reference to FIG. 4E, there is shown a summarized truth table that depicts the functionality of the token shifter 206a.

In accordance with an embodiment, the truth table denotes a relationship between the active state of one of the three input wires 411 to 413 (from the shift encoder 204a) that corresponds to the second unary number 214a, and the shifted token bit in the output unary number 216a (represented by the output wires "b−5 to b4" of the token shifter 206a).

In accordance with an embodiment, the token shifter 206a may be configured to route the input token bit of the first unary number 212 to the output token by applying a no-shift in a case in which the input wire 412 of the second unary number 214a is active. In accordance with an embodiment, the token shifter 206a may be configured to route the input token bit of the first unary number 212 to the output token by applying a left shift in a case in which the input wire 411 of the second unary number 214a is active. In accordance with an embodiment, the token shifter 206a may be configured to route the input token bit of the first unary number 212 to the output token by applying a right shift in a case in which the input wire 413 of the second unary number 214a is active. In an embodiment, the number represented by the output token may be utilized as the output unary number 216a.

In accordance with an embodiment, the output unary number 216a may be transferred to the token shifter 206b. The transferred output unary number 216a may be fed to the (n+2)-bit wide input token of another token shifter 206b to perform a subsequent shift operation, such as a second shift operation, by the token shifter 206b. The second shift operation may result in the second output unary number 216b.

In accordance with an embodiment, alternatively, the output unary number 216a may be transferred to the token decoder 208. The token decoder 208 may decode the output unary number 216a to a number representation corresponding to the first addend 210a and/or the second addend 210b. The decoded number 218 may indicate a summation of the plurality of addends, such as the first addend 210a and the second addend 210b. The final summation may be a 10-bit wide decoded output, physically represented by a signal on 10 wires.

In an implementation, the output unary number 216b may be transferred to the token decoder 208 (when the adder 200B is implemented for parallel processing of three addends). The token decoder 208 may decode the output unary number 216a to a number representation corresponding to the first addend 210a, the second addend 210b, and/or the third addend 210c. The decoded number 218 may indicate a summation of the plurality of addends, such as the first addend 210a, the second addend 210b, and also the third addend 210c in this case. The final summation may be a 12-bit wide decoded output, physically represented by a signal on 12 wires.

The token decoder 208 decodes (or converts) the decoded number 218 to the native coding of the application using the disclosed adder 200A. For example, the token decoder 208 may decode the decoded number 218 to the two's complement binary number representation. In accordance with an embodiment, the decode number 218 may correspond to a count of phase error bits generated by the digital phase detector logic 108. In accordance with an embodiment, the summation result may correspond to a count of phase error bits generated by the digital phase detector logic 108.

Figure 4F:
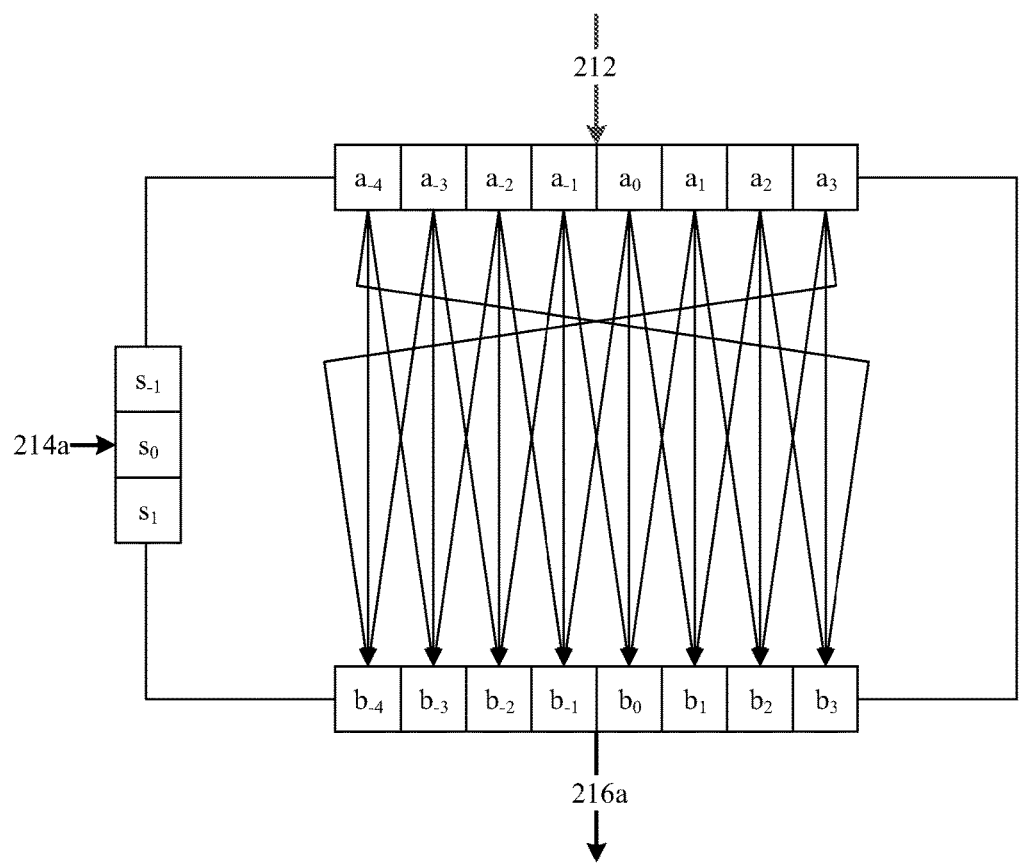

FIG. 4F shows another exemplary token shifter, such as the token shifter 206a, to explain the shift operation mechanism, in accordance with an embodiment of the disclosure. With reference to FIG. 4F, there is shown the shift operation mechanism, in accordance with an alternative embodiment of the disclosure.

In accordance with an embodiment, the range of numbers represented by the decoded number 218 may be such that the sum of the plurality of input addends, such as sum of the first addend and the second addend as shown and described in FIG. 2A, or the summation of the first addend up to the nth addend as shown and described in FIG. 2B, does not cause any arithmetic overflow. This may be achieved by widening of the output token space (output unary number) at the output of each token shifter 206a to 206n, as described in FIG. 4A. However, certain applications may require the summation, such as the output token space, to be of a specific width, regardless of the size or range of numbers of the plurality of input addends. In such a case, a wrapping operation may be performed, as shown in FIG. 4F.

In the wrapping operation, the routing paths for the output wires, such as "b−4" and "b3", located at the ends of the token shifter 206a, may be modified, as shown. For example, the routing paths may be modified from the n-bit wide input token (which corresponds to the first unary number 212) to an output token such that the size of the n-bit wide input token and the output token remain constant. The output token may correspond to the output unary number 216a and may be physically represented by 8 wires, such as "b−4 to b3" in an example. Based on such routing mechanism, the sum returned may be modulo of the number span represented by the output token.

Figure 4G:
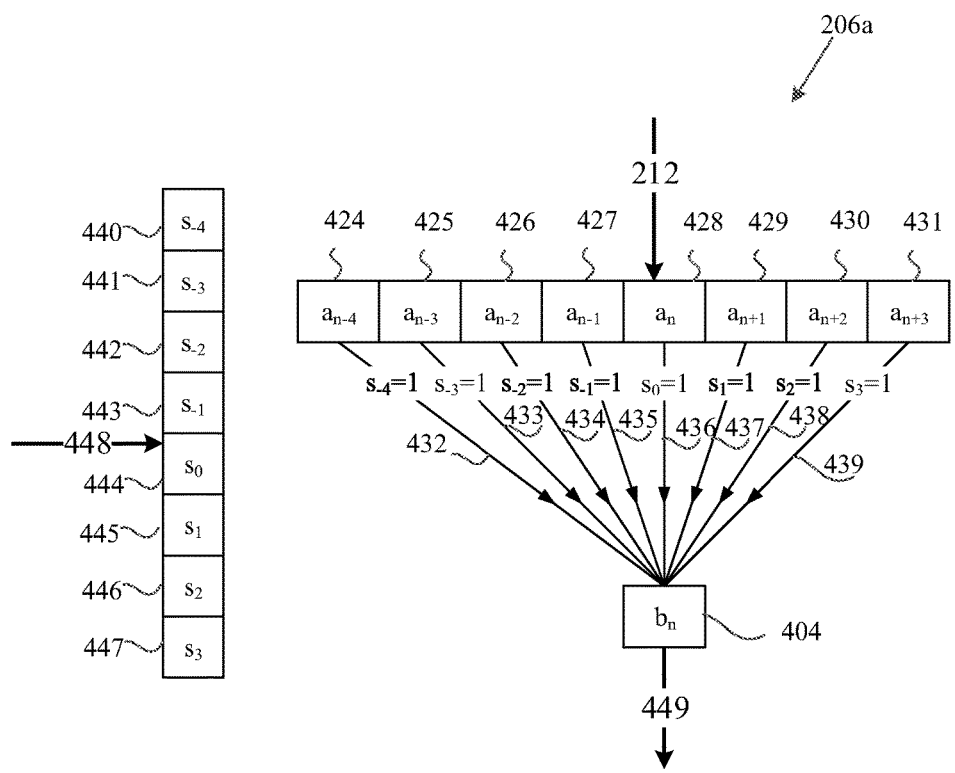

FIG. 4G shows another exemplary portion of the switch matrix of the token shifter 206a to further describe the shifting mechanism, in accordance with an alternative embodiment of the disclosure. With reference to FIG. 4G, there is shown the nth output wire 404 of the token shifter 206a, input wires 424 to 431 of the token shifter 206a, routing paths 432 to 439, and input wires 440 to 447 of the shift encoder 204a (for a case in which the shift encoder 204a comprises of a signal on 8 wires).

In accordance with an embodiment, the size of the plurality of addends may be variable as per requirement. All input addends may or may not have same size or range of numbers. As shown and described in FIGS. 2A, 2B, 3A, 3B, and 4A, the first addend 210a has a range "−4 to +3", whereas the input second addend 210b to nth addend 210n have a range of "−1 to +1". In an alternative embodiment, the input addends, such as the second addend 210b to nth addend 210n may represent a wider range of numbers. For example, the second unary number 448 may represent the second addend 210b, and include a number range from "−4 to +3", as shown in the FIG. 4G. In this case, the number of input wires 440 to 447 of the shift encoder 204a may be 8 wires. Hence, the number of routing paths for the nth output wire 404 of the token shifter 206a may increase from "3" to "8", as compared to the exemplary portion of the switch matrix of the token shifter 206a of FIGS. 4B, 4C, and 4D. The nth output wire 404 of the token shifter 206a may be one of the wires that carries the binary voltage or that represents the final position of the token bit in the output token that corresponds to the output unary number 449. The width (or size) of the output token that corresponds to the output unary number 449 in this case, may increase to represent the increased range of output numbers.

In accordance with an embodiment, each output wire of the token shifter 206a, such as the $n^{th}$ output wire 404, may have one of eight input wires 424 to 431 routed to it, as shown. The thick arrow mark shown at the input wire 428 may represent the position of the input token bit of the first unary number 212. The routing paths 432 to 439 may be implemented as switches but may also be realized as switches with buffers.

In accordance with an embodiment, each of the input addends of the plurality of addends may have a different size and may represent a different range of numbers. In accordance with an embodiment, all the addends may have the same size and may represent the same range of numbers. No restriction may be placed upon the size or the number range of the individual input addends with respect to the other addends for the implementation of the adder 200A or the adder 200B.

Figure 5A:
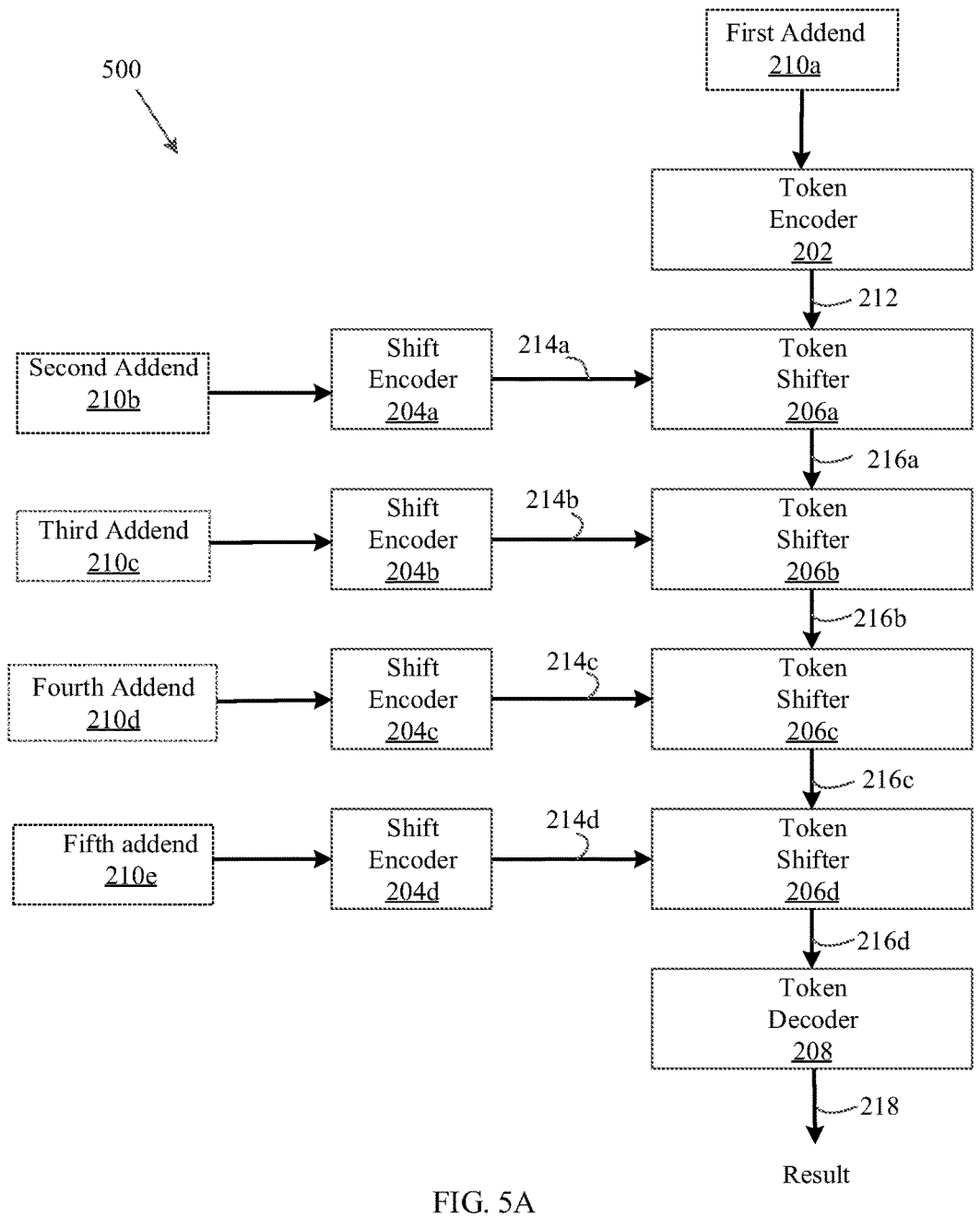
FIGS. 5A and 5B illustrate a first exemplary scenario for implementation of the disclosed system and method to process data in an adder based circuit, in accordance with an embodiment of the disclosure.
Figure 5B:
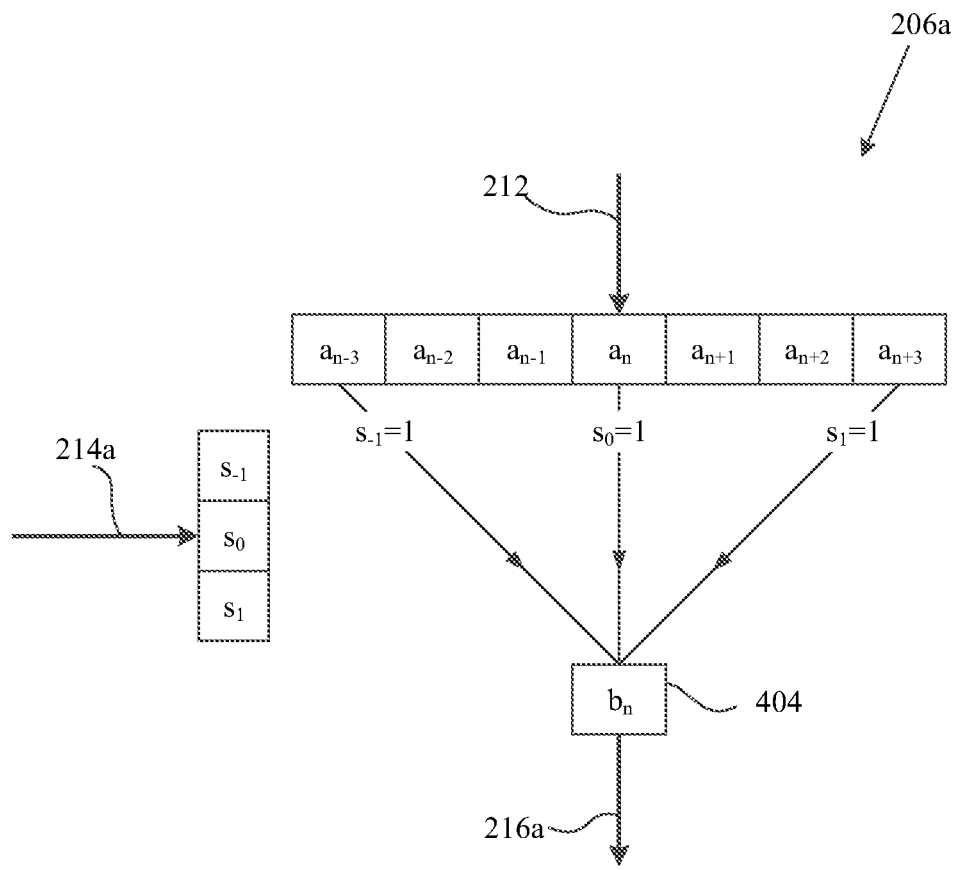

FIGS. 5A and 5B illustrate a first exemplary scenario for implementation of the disclosed system and method to process data in an adder based circuit, in accordance with an embodiment of the disclosure. FIGS. 5A and 5B have been described in conjunction with elements from FIGS. 1A, 1B, 1C, 2A, 2B, 3A to 3C, and 4A to 4G. With reference to FIG. 5A, there is shown an exemplary circuit architecture of implementation of an adder 500 with five input addends 210a to 210e. The adder 500 may be similar to that of the adder 200A and the adder 200B, but implemented with four pairs of shift encoders 204a to 204d and token shifters 206a to 206d, as shown. The adder 500 may further include the token encoder 202 and the token decoder 208.

In accordance with an embodiment, the processing of the first addend 210a and the second addend 210b may be similar to that as described in FIGS. 2A, 2B, 3A to 3C, and 4A to 4G. The addition of further addends may be accomplished by cascading three additional token shifters 206b to 206d after the token shifter 206a. With each additional token shifter 206b to 206d, the width of the output token after each shift operation may be increased. Thus, the third addend 210c may be added by adding the token shifter 206b with an input of 10 wires and an output of 12 wires and so on for the remaining addends. For example, the fourth addend 210d may be added by adding the token shifter 206c with an input of 12 wires and an output of 14 wires. Similarly, the fifth addend 210e may be added by adding the token shifter 206d with an input of 14 wires and an output of 16 wires. The final output unary number 216d of the final token shifter 216d may represent the summation of all the five input addends 210a to 210e but in token bit encoded form represented by use of 16 wires.

The token decoder 208 may convert (or decode) the 1-of-16 token coding to the native coding of the application, such as two's complement binary representation of the five input addends 210a to 210e by use of the adder 500. The function of the token decoder 208 may be realized by use of combinational logic. The decoded result may be the summation output, such as the decoded number representation 218. The decoded number representation 218 may indicate summation of the five input addends 210a to 210e computed based on the token bit shifting mechanism, as described in the FIGS. 2A 2B, and 4A to 4G.

In accordance with an embodiment, in certain applications, the data processing operations performed the adder 500, may involve multiplication of the input addends by a fixed factor prior to their summation. In such a case, the method and the system disclosed may allow one or more addends to be multiplied by a non-power-of-2 factor prior to the summation of addends. Further, the addends may have identical or differing multiplying factors.

In an example, the adder 500 depicted in FIG. 5A may implement the following mathematical function (1):

Sum=first addend 210a+second addend 210b+third addend 210c+fourth addend 210d+fifth addend 210e     (1)

In another example, when the second addend 210b represents a range of numbers from "−1" to "+1", and multiplied by the factor 3 (a non-power-of-2 factor), the adder 500 may implement the following mathematical function (2):

Sum=first addend 210a+3×second addend 210b+third addend 210c+fourth addend 210d+fifth addend 210e     (2)

The mathematical function (2) may be implemented by modifying routing paths for each of the output token wires in the token shifter 206a, as shown in FIG. 5B, in comparison to the routing paths as shown in FIG. 4B.

With reference to FIG. 5B, there is shown an exemplary portion of token shifter 206a. In accordance with an embodiment, the multiplication may be implemented by modifying the routing paths from the n-bit wide input token, physically represented by the input wires "$a_{n-3}$" to "$a_{n+3}$" to each of the output token wires, such as the $n^{th}$ output wire 404 of the token shifter 206a, in comparison to the routing paths shown in FIG. 4B.

In accordance with an embodiment, the routing skips two input wires and routes every third input wire to the $n^{th}$ output wire 404 of the token shifter 206a (unlike the routing paths 408 to 410 routed from adjacent input wires 405 to 407, as shown in FIG. 4B). Consequently, a factor of 3 may be introduced into second addend 210b prior to summation. Notwithstanding, other factors may also be implemented by a variation of the number of input wires skipped by the routing paths, without limiting the scope of the disclosure. In accordance with an embodiment, the $n^{th}$ output wire 404 of the token shifter 206a may be routed from one of the three input wires from the n-bit wide input token, under control of the output of shift encoder 204a, which is the second unary number 214a.

Figure 6:
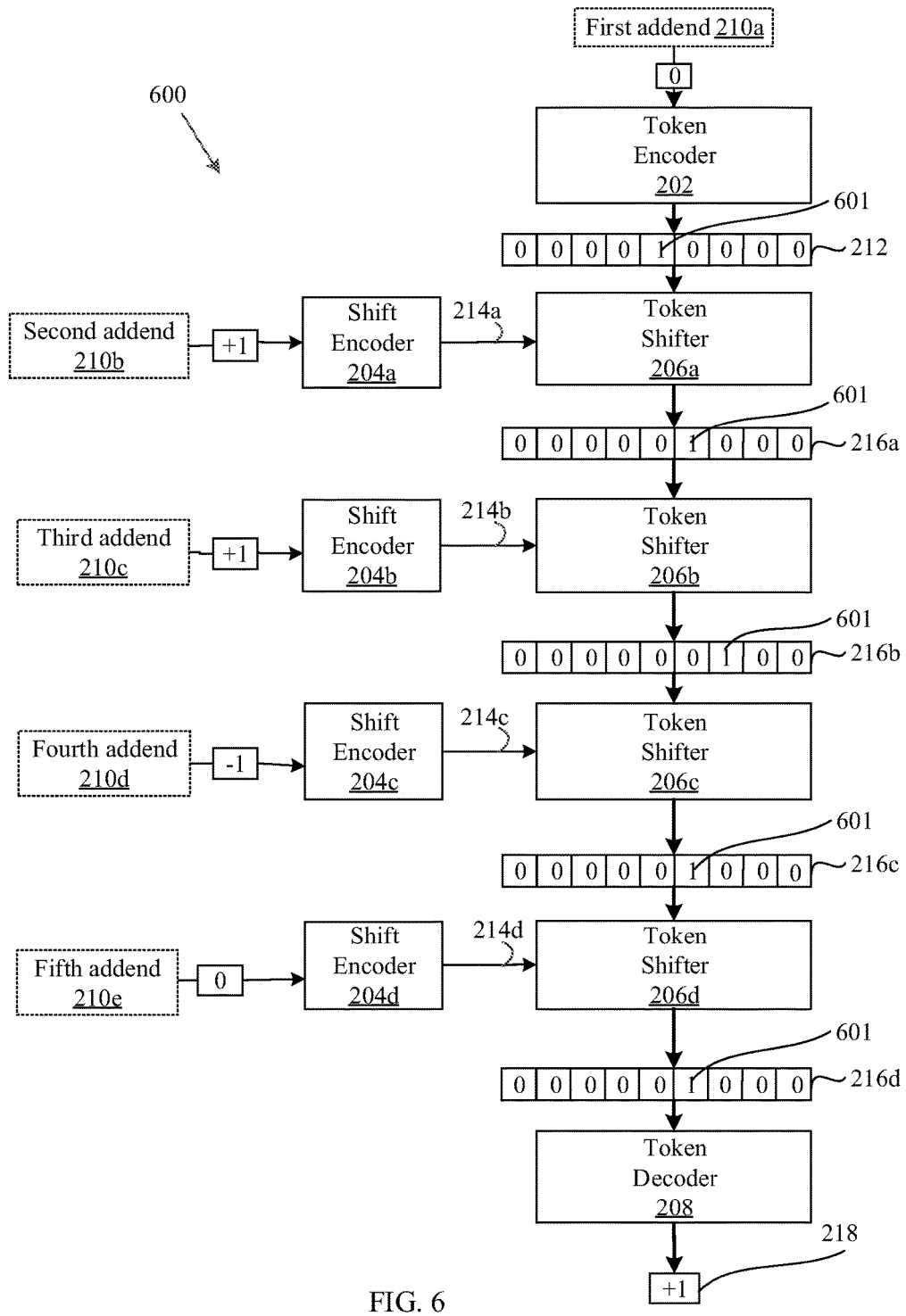
FIG. 6 illustrates a second exemplary scenario for implementation of the disclosed system and method to process data in an adder based circuit, in accordance with an embodiment of the disclosure.

FIG. 6 illustrates a second exemplary scenario for implementation of the disclosed system and method to process data in an adder based circuit, in accordance with an embodiment of the disclosure. FIG. 6 has been described in conjunction with elements from FIGS. 1A, 1B, 1C, 2A, 2B, 3A to 3C, 4A to 4G, 5A, and 5B. With reference to FIG. 6, there is shown an adder 600. The adder 600 may include the token encoder 202, the shift encoders 204a to 204d, the token shifters 206a to 206d, the token decoder 208, input addends 210a to 210e, and a token bit 601.

In accordance with the second exemplary scenario, the first addend 210a, the second addend 210b, the third addend 210c, the fourth addend 210d, and the fifth addend 210e may be the numeric values "0", "+1", "+1", "−1", and "0" respectively. The decoded number 218 may be "+1".

In operation, the first addend 210a may be encoded as the first unary number 212 by the token encoder 202. In accordance with an embodiment, the first unary number 212 may comprise the token bit 601. For example, the first unary number 212 may comprise a single bit value "1" as the token bit. All other bit values of the first unary number 212 may be "0", as shown in FIG. 6. The first unary number 212 may be 9-bit wide input token, in which the position of the token bit 601 (such as "1" in the 9-bit wide input token) may represent the value of the first unary number 212. The second addend 210b that may be the numeric value "+1", may be encoded as the second unary number 214a (such as "001", as shown in FIG. 3C) by the shift encoder 204a.

In accordance with an embodiment, the token shifter 206a may perform a first shift operation on the token bit 601 in the first unary number 212 based on the second unary number 214a to generate the output unary number 216a (such as "000001000"). In this case, the first shift operation may be a right shift of the token bit 601 that may shift the token bit 601 by one bit position towards right in the 9-bits wide token, as shown in FIG. 6. The shift operation has been described in detail in FIGS. 4B to 4F.

In accordance with an embodiment, the third addend 210c that represents the value "+1" may be encoded as the third unary number 214b (such as "001", as shown in FIG. 3C) by the shift encoder 204b. The token shifter 206b may be configured to perform a second shift operation on the token bit 601 in the generated output unary number 216a, based on the third unary number 214b. The second shift operation may result in the output unary number 216b (such as "000000100"). In this case, the second shift operation may be another right shift of the token bit 601 that may shift the token bit 601 further by one bit position towards right in the 9-bits wide token, as shown in FIG. 6.

In accordance with an embodiment, the fourth addend 210d that represents the value "−1" may be encoded as the fourth unary number 214c (such as "100", as shown in FIG. 3C) by the shift encoder 204c. The token shifter 206c may perform a third shift operation on the token bit 601 in the generated output unary number 216b based on the fourth unary number 214c. The third shift operation may result in the output unary number 216c (such as "000001000"). In this case, the third shift operation may be a left shift of the token bit 601 that may shift the token bit 601 by one bit position towards left in the 9-bits wide token with respect to the token bit 601 in the output unary number 216b, as shown in FIG. 6.

In accordance with an embodiment, the fifth addend 210e may represent the value "0". The fifth addend 210e may be encoded as the fifth unary number 214d (such as "010") by the shift encoder 204d. The token shifter 206d may perform a fourth shift operation on the token bit 601 in the generated output unary number 216c based on the fifth unary number 214d. In this case, the fourth shift operation may be a no shift operation and thus the value of the output of the fourth shift operation, such as the output unary number 216d (such as "000001000") may be same as the output unary number 216c. The position of the token bit 601 in the output unary number 216d may indicate the summation of the input addends 210a to 210e in unary number representation.

In accordance with an embodiment, the input addends 210a to 210e may be received from parallel input data samplers (an example of input data samplers is the data sampler 102, as shown and described in FIG. 1A). In accordance with an embodiment, the token summation process of the multiple input addends 210a to 210e may occur within a phase detector, such as the digital phase detector logic 108.

The output of the token shifters 206a to 206d may represent the phase error measurement which may then be the input to a loop filter, such as the digital loop filter 110 (FIG. 1A). In accordance with an embodiment, the input addends 210a to 210e may be received from a single input data sampler, such as the data sampler 102, at different time instances. In accordance with an embodiment, the token decoder 208 may decode the generated output unary number 216d to a number representation corresponding to the addends 210a to 210e. The decoded number 218 indicates a summation of "0"+"1"+"1"−"1"+"0". The value of the decoded number 218 may be "+1".

FIG. 7 illustrates a third exemplary scenario for implementation of the disclosed system and method to process data in an adder based circuit, in accordance with an embodiment of the disclosure. FIG. 7 has been described in conjunction with elements from FIGS. 1A, 1B, 1C, 2A, 2B, 3A to 3C, 4A to 4G, 5A, 5B, and 6. With reference to FIG. 7, there is shown an exemplary circuit architecture for processing data in an adder 700. The adder 700 may include the token encoder 202, the shift encoders 204a to 204d, the token shifters 206a to 206d, the token decoder 208, input addends 701a to 701e, two token bits 702 and 703, first unary numbers 704, other output unary numbers 705a to 705e (generated based on shift operations), and decoded numbers representation 706.

In accordance with an embodiment, the summation process for multiple numbers may occur simultaneously. For instance, two numbers, such as "−2" and "+2", that may be represented by two token bits, such as the token bits 701 and 702, may be placed on the same set of wires, such as the input wires "$a_{-4}$ to $a_4$" of the token shifter 206a. The same set of wires can hold multiple, non-identical numbers because a number is represented by the position of the token bit, not the state of all the wires together. In accordance with the third exemplary scenario, there is shown simultaneous processing of the two numbers having values "−2, +2" in the same set of wires of token shifter(s). The two numbers having values "−2, +2", may correspond to the first addends 701a. The second addend 701b, the third addend 701c, the fourth addend 701d, and the fifth addend 701e may be the numeric values "+1", "+1", "−1", and "0", respectively, similar to that as described in FIG. 6. The decoded numbers representation 706 may be "+1" and "+3", as shown.

In operation, the first addends 701a may be encoded as the first unary numbers 704 (such as "001000100") by the token encoder 202. The position of the token bit 702 (such as "1") may indicate the number "−2" in the 9-bit wide input token that corresponds to the first unary numbers 704. The position of the token bit 703 may indicate the number "+2" in the same 9-bit wide input token that corresponds to the first unary numbers 704.

The processing may be similar to that as described previously in FIGS. 2A, 2B, and 6. For instance, the second addend 701b that may be the numeric value "+1", may be encoded as a second unary number (such as "001", as shown in FIG. 3C) by the shift encoder 204a. The token shifter 206a may perform a first shift operation on the two token bits 702 and 703 based on the second unary number to generate the output unary numbers 705a (such as "000100010"). In this case, the first shift operation may be a right shift of both the token bits 702 and 703 simultaneously by one bit position towards right in the 9-bits wide token, as shown in FIG. 7. Each additional input addend, such as the third addend 701c, the fourth addend 701d, and the fifth addend 701e, may be processed by use of additional pairs of shift encoders 204b to 204d and token shifters 206b to 206d, as shown. The position of the token bits 702 and 703 in the output unary number representation 705d may indicate the summation of the input addends 701a to 701e in unary number representation.

In accordance with an embodiment, the token decoder 208 may decode the generated output unary numbers 705d to a number representation corresponding to the input addends 701a to 701e. The decoded numbers representation 706 indicates a summation of the addends 701a to 701e. The value of the decoded numbers representation 706 processed simultaneously may be "−1, +3" in this case, as shown in FIG. 7.

A person having ordinary skill in the art will understand that the circuit architectures of the exemplary adders 200A, 200B, 600, and 700 shown and described for implementation of the disclosed system and method to process data, have been provided for illustrative purposes and should not be construed to limit the scope of the disclosure. The disclosure may be implemented in various other circuit architectures with one or more variations, such as variation in addend size, number of addends, multiplication of addends, token width, token bit representation, arithmetic overflow, or underflow wrapping, simultaneous processing of multiple token bits, as described previously, without departure from the scope of the disclosure.

Figure 8:
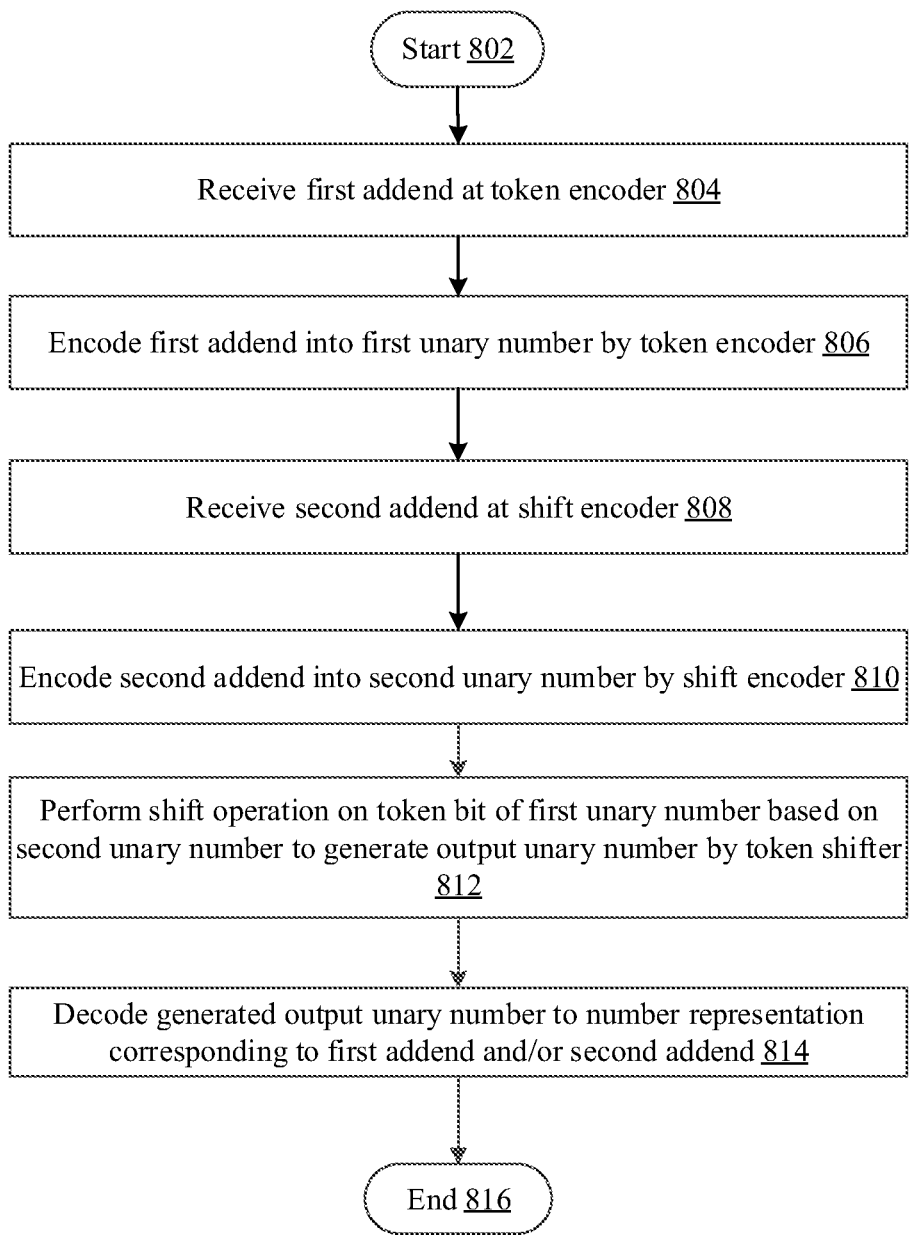
FIG. 8 is a flowchart that illustrates an exemplary method to process data in the adder, in accordance with an embodiment of the disclosure.

FIG. 8 is a flowchart that illustrates an exemplary method for processing data in an adder, in accordance with an embodiment of the disclosure. FIG. 8 is described in conjunction with elements of FIGS. 1A, 1B, 1C, 2A, 2B, 3A to 3C, 4A to 4G, 5A, 6, and 7. The method 800 may be implemented in an adder, such as the adders 200A, 200B, 500, 600, or 700 that may be used in an integrated circuit, such as the DPLL 100. The method starts at step 802 and proceeds to step 812.

At step 804, a first addend (such as the first addend 210a) may be received. The first addend may be received at a token encoder (such as the token encoder 202) of an adder, such as the adders 200A, 200B, 500, 600 or 700. In accordance with an embodiment, the first addend may correspond to a binary coded number that may be stored in the memory element, such as the register.

At step 806, the first addend may be encoded (or converted) into a first unary number (such as the first unary number 212). The first addend may be encoded by a token encoder (such as the token encoder 202). The first unary number may comprise a token bit (such as the token bit 601). In accordance with an embodiment, the first unary number may correspond to the n-bit wide input token that may comprise a plurality of token bits (as shown in FIG. 7). A position of the token bit(s) in the n-bit wide input token may indicate a value of the first addend(s).

At step 808, a second addend (such as the second addend 210b) may be received. The second addend may be received at a shift encoder (such as the shift encoder 204a) of the adder. In accordance with an embodiment, the second addend may correspond to an incoming phase error information.

At step 810, the second addend (such as the second addend 210b) may be encoded into a second unary number (such as the second unary number 214a). The second addend may be encoded by the shift encoder, such as the shift encoder 204a.

At step 812, a shift operation may be performed on the token bit (such as the token bit 601) in the first unary number, based on the second unary number. The shift operation may be performed by a token shifter (such as the token shifter 206a). Based on the shift operation, the token shifter 206a may generate an output unary number, such as the output unary number 216a. The shift operation may result in the shifting of the token bit by at least one bit position.

At step 814, the generated output unary number (such as the output unary number 216a) may be decoded to a number representation (such as the decoded number 218) similar to the number representation of first addend and/or the second addend. The generated output unary number may be decoded by a token decoder, such as the token decoder 208. In accordance with an embodiment, the obtained decoded number (such as the decoded number 218) may be a number that indicates a summation of the plurality of addends, such as the first addend and the second addend in this case. In accordance with an embodiment, the steps 810 and step 812 may be repeated for each additional addend, as described in FIG. 2B. The control may pass to end step 816. In accordance with an embodiment, decoded number may indicate a summation of the plurality of addends. In accordance with an embodiment, the input addends may be received from parallel input data samplers (an example of input data samplers is the data sampler 102, as shown and described in FIG. 1A).

Figure 9A:
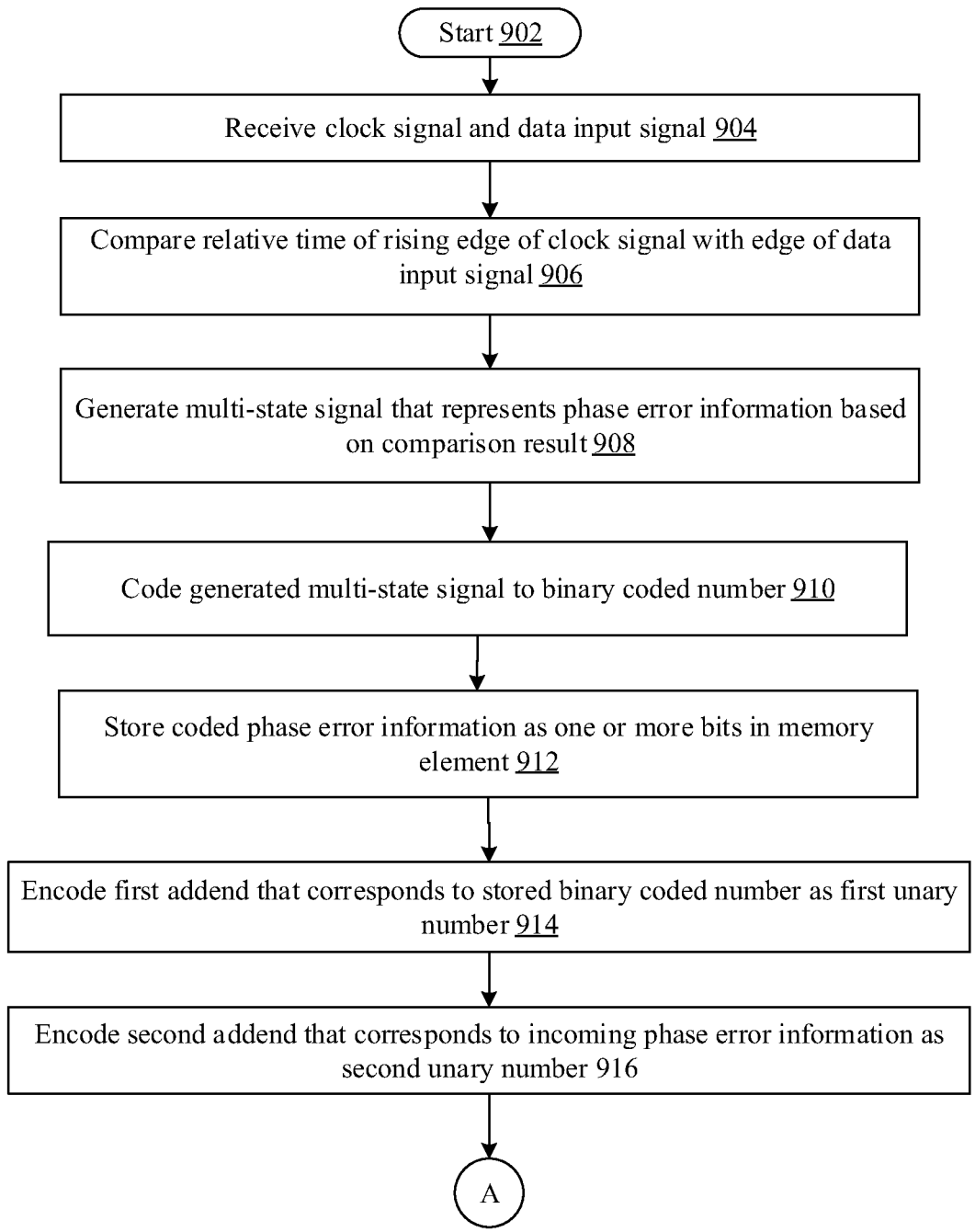
FIGS. 9A and 9B, collectively, depict another flowchart that illustrates another exemplary method to process data in the adder based circuit, in accordance with an embodiment of the disclosure.
Figure 9B:
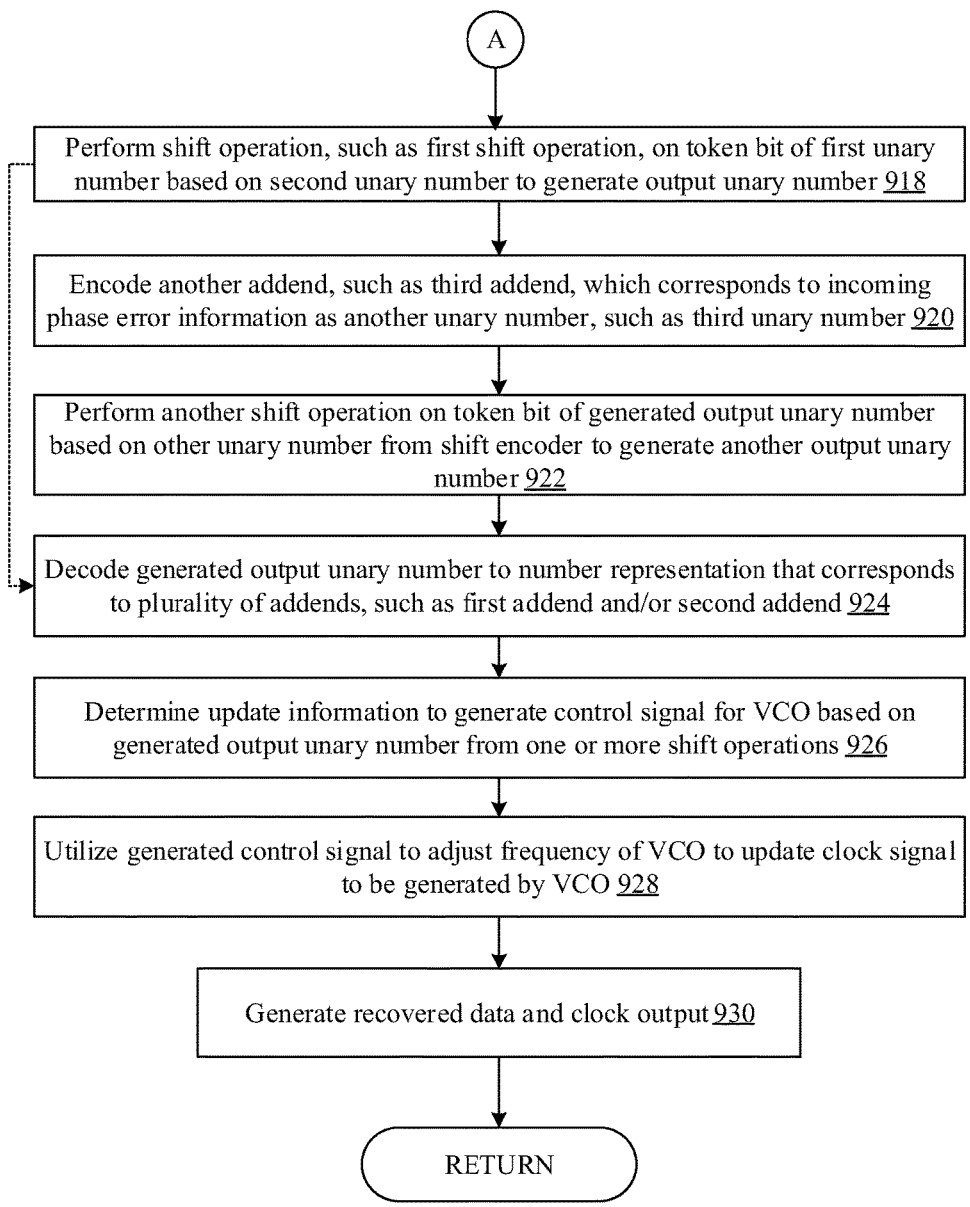

FIGS. 9A and 9B, collectively, is another flowchart that illustrates another exemplary method for processing data in the adder based circuit, in accordance with an embodiment of the disclosure. FIGS. 9A and 9B are described in conjunction with elements of FIGS. 1A, 1B, 1C, 2A, 2B, 3A to 3C, 4A to 4G, 5A, 5B, 6, 7, and 8. The method 900 may be implemented in an adder based circuit, such as the integrated circuit of the DPLL 100. The method starts at step 902 and proceeds to step 904.

At step 904, a clock signal input and a data input signal may be received. The clock signal input may be received from the VCO 114, and the received data input signal may be sampled by use of the clock signal from the VCO 114. At step 906, a rising edge of the clock signal from the VCO 114 may be compared with an edge of the data input signal from a reference source in reference to one or more time instances. In accordance with an embodiment, the comparison may be performed by the digital phase detector logic 108.

At step 908, a multi-state signal (referred to as phase error) may be generated based on the comparison of relative time of a signal edge of an input signal, such as the data input signal, with another signal edge of a reference signal, such as the clock signal, at a certain time instant. Such multi-state signal may be generated by the digital phase detector logic 108. In accordance with an embodiment, the generated multi-state signal may correspond to phase error information. The phase error information may represent whether the rising edge of the clock signal has arrived earlier or later (a lag) with respect to the edge of the data input signal. In accordance with an embodiment, the phase error information may represent whether the falling edge of the clock signal has arrived earlier or later with respect to the edge of the data input signal.

At step 910, the generated multi-state signal may be coded to a binary coded number. In accordance with an embodiment, the digital phase detector logic 108 may be configured to code the multi-state signal. Alternatively, in accordance with an embodiment, digital loop filter 110 may be configured to code the multi-state signal. For example, the multi-state signal may be coded by use of two's complement representation to generate the binary coded number. Examples of the coding techniques used to code phase error information may include, but are not limited to, one's complement representation, signed binary number representation, and/or unsigned binary number representation.

At step 912, the coded phase error information may be stored as one or more bits in a memory element, such as a register. In accordance with an embodiment, it may be determined whether the value (such as a phase error value) that corresponds to the phase error information is less than or equal to a predetermined threshold value. It may be desirable to minimize the phase error information by presetting the predetermined threshold value to a minimum value. For example, the predetermined threshold value may be set to zero or approximately to zero. Such determination may be carried out by the digital phase detector logic 108. Alternatively, in accordance with an embodiment, such determination of whether the phase error value that corresponds to the phase error information is less than or equal to a predetermined threshold value, may not occur. In such an embodiment, the processing of the one or more addends may still occur to integrate the phase error information. A recovered data and clock signal may be outputted in each VCO cycle. In accordance with an embodiment, the recovered data and clock signal may be outputted with minimized phase error in each VCO cycle so that the phase error integration may be performed over multiple VCO cycles.

In accordance with an embodiment, the phase error information may be added or subtracted to the value in the register and in this manner, the phase error integration may be performed. The addition or subtraction of the phase error information may be performed by use of an adder (such as the adders 200A, 200B, 500, 600, or 700) with the plurality of addends. The plurality of addends may correspond to the existing contents of the memory element and the incoming phase error information.

At step 914, a first addend that may be the stored binary coded number may be encoded as a first unary number. An example of the encoding (or conversion) of the first addend, such as the first addend 210a, is shown and described in FIGS. 2A, 2B, and 3A. For instance, the token encoder 202 may encode the stored binary phase information, such as the first addend 210a, to the first unary number 212 representation. The first unary number may comprise a token bit. In other words, the first unary number may correspond to an n-bit wide token (physically represented as n-number of wires, such as the input wires "$a_{-4}$" to "$a_3$" in FIG. 3A) that may comprise the token bit (physically represented as a binary voltage in one of the n-number of wires). A position of the token bit in the n-bit wide token may indicate the value of the binary coded number (the first addend).

At step 916, a second addend that may be the incoming phase error information may be encoded as a second unary number. For instance, the shift encoder 204a may encode the input second addend 210b, which may be represented as a two's complement number, to the second unary number 214a, as shown and described in FIGS. 2A, 2B, and 3C in an example.

At step 918, a shift operation, such as first shift operation, on a token bit of the first unary number (such as the first unary number 212) may be performed based on the second unary number (such as the second unary number 214a). The first shift operation may generate an output unary number (such as the output unary number 216a). In an implementation, the output unary number may be an "n+2" wide output token that represents an expansion of the token width of the n-bit wide input token, as described in FIGS. 2A, 2B, and 4A. In accordance with an embodiment, during the subsequent cycles of the shift operation, the size of the n-bit wide input token after each shift operation may increase. In another implementation, the token width may not be expanded in the shift operation, as shown and described in FIGS. 4F, 6, and 7. An example of the shift operation is shown and described in FIG. 4A to 4G.

In accordance with an embodiment, the processing of the plurality of addends, such as the first addend, and subsequent addends, may be performed by the digital loop filter 110. In accordance with an embodiment, further incoming phase error information that corresponds to the subsequent input addends, such as a third addend, a fourth addend, and so on, may be received. In accordance with an embodiment, the input addends may be received from parallel input data samplers (an example of input data samplers is the data sampler 102, as shown and described in FIG. 1A). In accordance with an embodiment, the input addends may be received from one input data sampler simultaneously or at certain time intervals. In accordance with an embodiment, the output unary number (such as the output unary number 216a) from the first shift operation may be the summation of the first addend and the second addend which indicates the current phase error information. This phase error information may be utilized to minimize the phase error over multiple VCO cycles to generate integrated data output signal and clock signal.

In accordance with an embodiment, another input addend may also be received. In such a case, at step 920, another input addend, such as the third addend 210c, which corresponds to the other incoming phase error information, may be encoded into another unary number, such as the third unary number 214b. For instance, a shift encoder, such as the shift encoder 204b, may be configured to encode (or convert) the third addend 210c to the third unary number 214b, as shown and described in FIGS. 2B and 5A.

At step 922, another shift operation, such as the second shift operation, may be performed on the token bit of the generated output unary number (generated in first shift operation). The other shift operation may be performed by a token shifter, such as the token shifter 206b, based on the other unary number (such as the third unary number 214b) to generate another output unary number (such as the output unary number 216b). In accordance with an embodiment, the output unary number (such as the output unary number 216b) from the second shift operation may be the summation of the first addend, the second addend, and the third addend which indicates the updated phase error information. This phase error information may be further utilized to minimize the phase error over another VCO cycle (over multiple VCO cycles).

At step 924, the generated other output unary number (such as the output unary number 216b) may be decoded to a number representation similar to a number representation of the plurality of addends, such as the first addend, the second addend, and/or the third addend. The position of the token bit in the other output unary number indicates the value of the other output unary number (such as the output unary number 216b).

At step 926, an update information may be determined to generate a control signal for the VCO 114. The update information may be based on the position of the token bit in the generated output unary number (such as the output unary number 216b). At step 928, the generated control signal may be utilized to adjust the frequency of the VCO 114. The adjusted frequency may be used to update the clock signal. The updated clock signal may minimize the incoming phase error information over a plurality of VCO cycles. The phase error information received may be integrated over time to obtain the integrated recovered data output signal and the clock signal.

At step 932, a recovered data output signal and a recovered clock signal may be generated at each VCO cycle. For instance, when the value of the incoming phase error information that may be referred to as phase error value, is less than or equal to the predetermined threshold value, such as zero, due to the updated clock signal, the DeMUX 106 may be configured to generate the recovered data output signal and the recovered clock signal with minimized or no phase error (integrated), as shown and described in FIG. 1A. A recovered data and clock signal may be outputted in each VCO cycle. In accordance with an embodiment, the recovered data and clock signal may be outputted with minimized phase error in each VCO cycle so that the phase error integration may be performed over multiple VCO cycles. Control may return back to start another VCO cycle. For instance, the control may pass back to the step 904 or may receive another incoming phase error information to further process to integrate the phase error, in an example.

In accordance with an embodiment of the disclosure, a system that processes data in an adder based circuit is disclosed. The system may comprise an adder (such as the adders 200A, 200B, 500, 600 or 700 (as described in FIGS. 2A, 2B, 5A, 6, and 7, respectively)) based circuit, such as an integrated circuit (an example of the integrated circuit may be the DPLL 100a (FIG. 1A). One or more circuits of the integrated circuit may be configured to encode the first addend 210a as the first unary number 212. The first unary number 212 may comprise the token bit (such as the token bit 601. The one or more circuits may be further configured to encode the second addend 210b as the second unary number 214a. One or more circuits of the integrated circuit may be configured to perform the first shift operation on the token bit in the first unary number 212 based on the second unary number 214a, to generate the output unary number 216a. One or more circuits of the integrated circuit may be configured to decode the generated output unary number 216a to a number representation that corresponds to the first addend 210a and/or the second addend 210b. The decoded number representation may indicate a summation of the first addend 210a and the second addend 210b.

Various embodiments of the disclosure may provide a non-transitory computer readable medium and/or storage medium, and/or a non-transitory machine readable medium and/or storage medium having stored thereon, a set of instructions executable by a machine and/or a computer to process data in an adder based circuit of an electronic device is disclosed. The set of instructions in the electronic device may cause the machine and/or computer to perform the steps that comprise encoding of the first addend 210a as the first unary number 212. The first unary number 212 may comprise a token bit. The second addend 210b may be encoded as the second unary number 214a. A first shift operation may be performed on the token bit in the first unary number 212 based on the second unary number 214a. The first shift operation may be performed to generate the output unary number 216a. The generated output unary number 216a may be decoded to a number representation 218 that may correspond to the number representation of the first addend 210a and/or the second addend 210b. The decoded number representation 218 may indicate a summation of the first addend 210a and the second addend 210b.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A system, comprising:
    a digital phase detector logic circuit configured to:
        generate a multi-state signal based on comparison of a first signal edge of an input signal with a second signal edge of a reference signal at a time instant; and
        generate phase error information based on said multi-state signal;
    a digital loop filter configured to code said generated phase error information;
    a memory configured to store said coded phase error information, wherein said digital loop filter comprises:
        a token encoder configured to encode a first addend as a first unary number, wherein said first addend corresponds to said stored phase error information, and wherein said first unary number comprises a token bit;
        a shift encoder configured to encode a second addend as a second unary number;
        a token shifter configured to:
            shift, by a first shift operation, said token bit in said first unary number, wherein said token bit is shifted based on said second unary number; and
            generate an output unary number based on said shifted token bit;
        a token decoder configured to:
            decode said generated output unary number; and
            generate a number representation corresponding to at least one of said first addend or said second addend based on said decoded said generated output unary number, wherein said number representation indicates a summation of said first addend and said second addend; and
    wherein said digital loop filter is further configured to:
        determine update information based on said generated number representation that indicates said summation of said first addend and said second addend; and
        generate a control signal for a voltage controlled oscillator (VCO) based on the update information.

2. The system according to claim 1, wherein said first shift operation corresponds to a shift in a position of said token bit in said first unary number based on said second unary number, to generate said output unary number, and
    wherein said generated output unary number indicates an increment or a decrement in a numeric value of a binary coded number.

3. The system according to claim 1, wherein said digital phase detector logic circuit is further configured to detect a phase error value associated with said phase error information, and wherein said phase error value is greater than a specific threshold error value.

4. The system according to claim 1, wherein said digital phase detector logic circuit is further configured to determine said update information based on a position of said token bit in said generated output unary number, wherein said control signal is used to adjust a frequency of said VCO, and wherein said adjusted frequency corresponds to said reference signal.

5. The system according to claim 2, wherein said digital loop filter is further configured to code said phase error information to said binary coded number.

6. The system according to claim 5, wherein said memory is further configured to store said coded phase error information as at least one bit, and wherein said at least one bit represents said binary coded number.

7. The system according to claim 6, wherein a shift in position of said token bit in said generated output unary number indicates said increment or said decrement in said numeric value of said binary coded number, and
    wherein said binary coded number corresponds to said stored said coded phase error information.

8. The system according to claim 6, wherein said second addend corresponds to incoming phase error information.

9. The system according to claim 6, wherein said token shifter is further configured to shift, by a second shift operation, a position of said token bit in said generated output unary number based on a third unary number, and wherein said third unary number is an encoded third addend that corresponds to incoming phase error information.

10. The system according to claim 9, wherein said token bit is shifted by said second shift operation based on said incoming phase error information that is unequal to zero or is greater than a specific threshold error value.

11. The system according to claim 1, wherein a first bit value of said token bit of said first unary number is different from a second bit value of bits, other than said token bit, corresponding to said first unary number.

12. The system according to claim 1, wherein said first unary number corresponds to a n-bit wide token represented by a set of n-number of wires, and
    wherein a position of said token bit in said n-bit wide token indicates a value of said first addend.

13. The system according to claim 1, wherein said digital phase detector logic circuit is further configured to route said token bit of said first unary number from an input of said token shifter to an output of said token shifter in said first shift operation to generate said output unary number, and wherein said token bit is routed by selection of a routing path from a plurality of routing paths of said token shifter under control of said second unary number.

14. A method, comprising:

in a system that includes a digital phase detector logic circuit, a digital loop filter, and a memory, wherein said digital loop filter includes a token encoder, a shift encoder, a token shifter and a token decoder:

generating, by said digital phase detector logic circuit, a multi-state signal based on comparison of a first signal edge of an input signal with a second signal edge of a reference signal at a time instant;

generating, by said digital phase detector logic circuit, phase error information based on said multi-state signal;

coding, by said digital loop filter, said generated phase error information;

storing, in said memory, said coded phase error information;

encoding, by said token encoder, a first addend as a first unary number, wherein said first addend corresponds to said stored phase error information, and wherein said first unary number comprises a token bit;

encoding, by said shift encoder, a second addend as a second unary number;

shifting, by said token shifter, said token bit in said first unary number, wherein said token bit is shifted based on said second unary number;

generating, by said token shifter, an output unary number based on said shifted token bit;

decoding, by said token decoder, said generated output unary number;

generating, by said token decoder, a number representation corresponding to at least one of said first addend or said second addend based on said decoded said generated output unary number, wherein said number representation indicates a summation of said first addend and said second addend;

determining update information, by said digital loop filter, based on said generated number representation that indicates said summation of said first addend and said second addend; and generating, by said digital loop filter, a control signal for a voltage controlled oscillator (VCO) based on the update information.

15. The method according to claim 14, wherein said first unary number corresponds to a n-bit wide token represented by a set of n-number of wires, and wherein a position of said token bit in said n-bit wide token indicates a value of said first addend.

* * * * *